United States Patent
Walker et al.

(10) Patent No.: US 6,892,011 B2
(45) Date of Patent: May 10, 2005

(54) METHOD AND APPARATUS FOR FABRICATION OF PLASTIC FIBER OPTIC BLOCK MATERIALS AND LARGE FLAT PANEL DISPLAYS

(76) Inventors: James K. Walker, 2425 NW. 26th Pl., Gainesville, FL (US) 32605; Jacob R. Tymianski, 9104 NW. 64th Ter., Gainesville, FL (US) 32653; Yongcheng Li, 6791 Covered Bridge Pkwy., Prattville, AL (US) 36066; Bongsoo Lee, Hanyang Apt. 310-505, Seohyun-Dong, Pundang-Gu, Sungnam-Si, Kyungki-Do (KR); Jonathan Couch, 8809 SW. 141st Ave., Archer, FL (US) 32618

(*) Notice: Subject to any disclaimer, the term of this patent is extended or adjusted under 35 U.S.C. 154(b) by 455 days.

(21) Appl. No.: 10/016,841

(22) Filed: Dec. 14, 2001

(65) Prior Publication Data
US 2002/0168157 A1 Nov. 14, 2002

Related U.S. Application Data

(60) Provisional application No. 60/267,885, filed on Feb. 9, 2001, and provisional application No. 60/255,553, filed on Dec. 14, 2000.

(51) Int. Cl.⁷ .............................. G02B 6/04; G02B 6/08; B29D 11/00
(52) U.S. Cl. ....................... 385/115; 385/120; 264/1.28; 264/1.29
(58) Field of Search ................................. 385/115, 116, 385/120; 264/1.24, 1.28, 1.29

(56) References Cited

U.S. PATENT DOCUMENTS

| | | | |
|---|---|---|---|
| 3,853,658 A | 12/1974 | Ney | 156/180 |
| 3,909,109 A | 9/1975 | Aurenz | 385/116 |
| 4,139,261 A | 2/1979 | Hilsum | 385/120 |
| 4,271,104 A | 6/1981 | Anderson et al. | 264/1.24 |
| 4,299,447 A | 11/1981 | Soltan et al. | 349/159 |
| 4,406,850 A | 9/1983 | Hills | 264/169 |
| 4,547,040 A | 10/1985 | Yamamoto et al. | |
| 4,573,082 A | 2/1986 | Jeskey | 348/832 |
| 4,591,232 A | 5/1986 | Jeskey | 385/120 |
| 4,732,716 A | 3/1988 | Sakaunaga et al. | |
| 4,786,139 A | 11/1988 | Sedlmayr | 385/120 |
| 4,812,012 A | 3/1989 | Terada et al. | 385/115 |
| 4,842,365 A | 6/1989 | Terada et al. | 385/115 |
| 5,127,079 A | 6/1992 | Suzuki et al. | 385/117 |
| 5,129,028 A | 7/1992 | Soltan | 385/120 |
| 5,162,074 A | 11/1992 | Hills | 216/83 |

(Continued)

FOREIGN PATENT DOCUMENTS

| | | |
|---|---|---|
| JP | 59165006 | 9/1984 |
| JP | 60084508 | 5/1985 |
| JP | 63169603 | 7/1988 |
| JP | 03208001 | 9/1991 |
| JP | 04256905 | 9/1992 |

*Primary Examiner*—John D. Lee
(74) *Attorney, Agent, or Firm*—Saliwanchik, Lloyd & Saliwanchik

(57) ABSTRACT

This invention concerns a method and apparatus for manufacturing a sheet and a two-dimensional matrix of plastic optical fibers. The fibers may be of the step-index or graded-index type. Co-extrusion through a specially designed die is used to produce a sheet composed of a fiber array. The fiber sheet (ribbon) can be used for transmitting optical signals. These arrays may also be stacked and fused at high temperatures to form the two-dimensional matrix required for many applications such as large area image transfer. In addition, a high-speed, continuous manufacturing method is disclosed to produce a massive two-dimensional matrix of fibers. The method of manufacture permits high quality image transfer at low manufacturing cost in a wide array of geometries.

30 Claims, 23 Drawing Sheets

U.S. PATENT DOCUMENTS

| | | |
|---|---|---|
| 5,344,297 A | 9/1994 | Hills .................... 425/131.5 |
| 5,393,470 A * | 2/1995 | Miller ..................... 264/1.29 |
| 5,411,693 A | 5/1995 | Wust, Jr. ............. 264/172.15 |
| 5,465,315 A | 11/1995 | Sakai et al. ............. 385/116 |
| 5,466,410 A | 11/1995 | Hills ................... 264/172.11 |
| 5,551,588 A | 9/1996 | Hills ......................... 216/56 |
| 5,562,930 A | 10/1996 | Hills ......................... 425/198 |
| 5,593,621 A | 1/1997 | Koike et al. ............ 264/1.29 |
| 5,661,531 A | 8/1997 | Greene et al. ............ 349/73 |
| 5,668,569 A | 9/1997 | Greene et al. .......... 345/103 |
| 5,781,258 A | 7/1998 | Dabral et al. .............. 349/73 |
| 5,867,236 A | 2/1999 | Babuka et al. ............. 349/73 |
| 5,880,887 A | 3/1999 | Goto ....................... 359/626 |
| 5,881,195 A | 3/1999 | Walker ..................... 385/116 |
| 5,889,568 A | 3/1999 | Seraphim et al. .......... 349/73 |
| 5,903,328 A | 5/1999 | Greene et al. ............ 349/73 |
| 5,963,281 A | 10/1999 | Koons et al. .............. 349/73 |
| 6,040,807 A | 3/2000 | Hamagishi et al. ........... 345/6 |
| 6,548,431 B1 * | 4/2003 | Bansal et al. ............ 442/327 |

\* cited by examiner

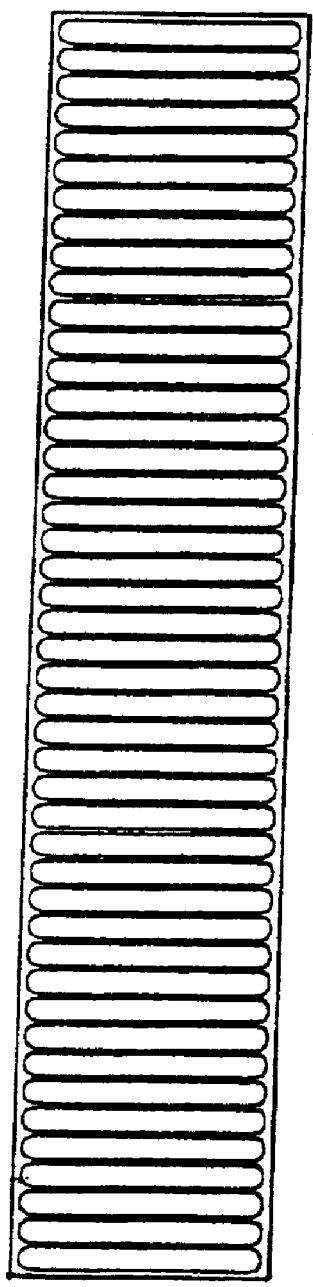
FIG. 5A  At exit of co-extrusion die
FIG. 5B  After draw down

METHOD AND APPARATUS FOR FABRICATION OF PLASTIC FIBER OPTIC BLOCK MATERIALS AND LARGE FLAT PANEL DISPLAYS

CROSS-REFERENCE TO A RELATED APPLICATION

This application claims priority from provisional patent application U.S. Ser. No. 60/267,885, filed Feb. 9, 2001 and provisional patent application 60/255,553, filed Dec. 14, 2000.

BACKGROUND OF THE INVENTION

Optical fibers are well known in the art of light transmission along a length of filament by multiple internal reflection of light. A single-core optical fiber usually consists of a core and a cladding which has an index of refraction lower than that of the core. A multi optical fiber bundle, often referred to as an image guide, can be effectively considered as a bundle of single optical fibers where each fiber transmits a light signal independent of the others. Optical fibers may be fabricated from glass or plastic.

One of the largest applications of a two-dimensional image guide is for transferring images. Because each individual fiber of the optical image guide transmits only a minute discrete portion of the image, it is of course preferred for each point of the end (face) of the image guide to be coherently related to the corresponding point on the other end (face) such that the image exiting the image guide is identical to that which enters the multiplicity of the fibers. Image resolution, brightness and contrast sensitivity are often used to characterize the image quality after transmission through the image guide.

U.S. Pat. No. 4,271,104 (1979) discloses a method for producing optical fiber ribbon. The method incorporates a single material and utilizes hot rolling and extrusion techniques. In order to form a plurality of adjacent fibers in the ribbon, longitudinal separation of fibers is made by reducing (or increasing) the refractive index at parallel lines delineating the array of fibers. Refractive index modification is achieved by applying strain to induce the photo-elastic effect, depositing barrier masks by using photolithography, thermal diffusion, ion exchange, and/or ion implantation. A disadvantage of this method is its complicated and inefficient way of achieving the effect of cladding. As mentioned in U.S. Pat. No. 4,271,104, the cross-talk between the individual fibers cannot be eliminated. In addition, this method cannot be efficiently utilized for making optical arrays or matrices with very fine cores. It is essentially a method for making preforms, which need to be drawn down in a later stage in order to reduce the size of the individual cores. The effective cladding achieved in this way can be seriously deteriorated in the drawing process.

Methods for producing polymer optical fiber matrices is described in a series of patents issued to Mitsubishi Rayon Company of Japan, for example U.S. Pat. No. 4,812,012 (1989), U.S. Pat. No. 4,842,365 (1989), EPO 0427232A2 and U.S. Pat. No. 5,127,079 (1992). These patents disclose co-extrusion of a core polymer material, a cladding polymer material, and sea polymer material through a multi-hole die to make the fiber matrix directly. This is a very efficient method for making small size, for example, less than 3 mm in cross-sectional dimension, multi-core optical fibers or plates. In order to make multi-core optical fibers or plates with bigger cross sections, many such small matrices have to be stacked and fused together in a later stage. A seamless image requires that fiber-to-fiber spacing inside a matrix be equal to fiber-to-fiber spacing across a seam between matrices. This requirement is not met by the Mitsubishi production technique which teaches a significant sea polymer thickness around the periphery of a matrix. The result of this stacking process on the transmitted image is to produce an image which has a pattern of seams corresponding to the interfaces between the matrices.

Furthermore, it is desired to manufacture polymer optical fiber matrices with very high production rates. The Mitsubishi patents cited above pertain to symmetric two-dimensional arrays of fiber matrices. Limited production rate due to difficulty in cooling a symmetric matrix of optical fibers is a significant limitation of the Mitsubishi patents.

Another limitation of the Mitsubishi patents is the use of step-index optical fiber which can reduce the light transmission at small microfiber diameters. Specifically, U.S. Pat. No. 4,842,365 in Table 2 teaches that the transmission loss (dB/m) is 2.3, 1.6, 0.91, 0.70 for diameters of 16, 28, 180, 225 micrometers, respectively. These measurements were made in the red region of the visible spectrum. The loss can be expected to be about a factor of two greater for blue light. The difference in loss for different colors can lead to image color distortion. Since the length of the light path in step-index fiber is independent of the fiber diameter, light absorption by the core material is independent of the fiber diameter. For this reason, the change in light transmission as a function of the fiber diameter is generally conceded to be due to imperfections at the core/cladding boundary.

In particular, the light will interact with the core/cladding boundary a greater number of times over the same length of fiber for smaller core fibers as compared with larger core fibers. This interpretation is buttressed by the observation that a single graded-index plastic optical fiber with diameter of 5.0 $\mu$m has been measured to have a transmission loss of 0.2 dB/m (Koike, Y. et al. (1993) in Design Manual and Handbook and Buyers Guide, Information Gatekeepers, Inc., Boston, p. 19). This measured transmission loss is about the same as is measured for fiber diameters of about 1.0 mm, implying that the graded-index fiber loss is dominated by material absorption unlike the case of small diameter step-index fibers. As a result of these considerations, existing image guides using step-index plastic optical fibers compromise both the optical transmission and the fidelity of image color.

In order to achieve better light transmission and improved resolution, U.S. Pat. No. 5,881,195 (1999) disclosed a plastic image guide comprising a plurality of gradient-index (GRIN) optical fibers. Single-core GRIN fibers are stacked, fused, and drawn to make a plastic image guide. One technique taught for attaining the variation in refractive index involves mixing two miscible transparent polymers with different refractive indices in a manner which produces a radial parabolic refractive index profile of the individual fibers. The use of this method is limited by the polymers which can be used. (1) the polymers must have good light transmission and have enough difference in refractive indices; and (2) the polymers must be compatible, for example miscible at the molecular level, in a wide range of mixing ratios. Nevertheless, image guides made in this way appear to have high resolution and good transmission. However, because this production method involves stacking, fusing, and drawing a plurality of single fibers, a practical limitation of about a 3 mm$^2$ transverse area for the image guides and low volume manufacturing capacity can result.

Single graded index plastic optical fiber can be produced by several known techniques, for example as described in U.S. Pat. No. 5,593,621. Many of these methods utilize batch production techniques in which a fixed quantity, typically a kilogram at most, of material is used to produce fiber. Accordingly, these methods can have limited production capacity.

Many researchers are in pursuit of a television set which can hang on a wall like a picture and be, at most, a few inches thick. A promising technology in this field today is the liquid crystal display (LCD). However, the following discussion also applies to plasma displays (PDs), field emission displays (FEDs), electroluminescent displays (ELDs), organic light-emitting displays (OLEDs) and digital mirror displays (DMDs). Liquid crystal displays have been commercially available for more than 20 years, but until recently have been restricted to a relatively small size. Recently, improvements in liquid crystal technology have occurred, allowing larger, high-line density displays to be manufactured.

One recent technique involves the addition of active switches to control the action of the liquid crystal at each picture element or pixel. The active switch can be a thin film diode or a thin film transistor. These displays are typically termed "Active Matrix Liquid Crystal Displays," or "AMLCD." These AMLCD's can achieve higher speed, higher contrast, and/or higher overall brightness. The use of these active devices to control "light valves" can greatly simplify the electronics of the display, but can also require one or more added fabrication sequences to deposit the active devices at each pixel. In addition, there is a need for leads to each device, such that on the order of hundreds of thousands of devices for each display may require leads.

The typical keys to the economical production of AMLCD's are the yield of the complex sequential process and the number of displays which may be cut from a panel. Currently, second generation panels are currently available up to around 21 inches, while third generation panels, expected some five years in the future, may be as much as 29 inches. Sizes much larger than 30 inches are not expected before the year 2010.

To reach larger sizes, where monolithics are not economical to produce due to the problems discussed above, a plurality of relatively small "tile" AMLCD's can be connected together in precise alignment to form a large display. Such displays are typically characterized by visually disturbing seams resulting from gaps between adjacent pixels on adjacent tiles. Thus, the image portrayed by using a seamed display often appears segmented and disjointed. Therefore, it is desirable to fabricate a tiled, flat-panel display which does not have noticeable, or even perceptible, seams.

The pixel pitch in electronic displays is set so that the minimum viewing distance will produce an imperceptible seam between pixels. With a standard pixel pitch P=0.26 mm, the minimum viewing distance is on the order of one meter. The minimum viewing distance will increase with the pixel pitch; therefore, when designing for the purpose of visually eliminating the seams, there is very little latitude in the selection of pixel pitch. For a seamless multi-tile display, it is generally agreed that at the intersection of the tiles, the edge dimensions thereof are preferably maintained so that the interpixel spacing remains uniformly periodic throughout the tiles and across the seams.

A frame can surround the edge of the glass panels containing the AMLCD's. Seals for liquid-crystal displays are generally located at the perimeter thereof and can be covered by the frame. Such seals can provide a mechanical joint between the top and bottom glass plates of the flat-panel displays (FPD), as well as containing the liquid-crystal material between the plates. The widths of the seals themselves are customarily a few millimeters. When space is allowed for electrical connections, a typical non-luminous width around a standard production AMLCD may be about 6 mm, or about 7 mm including tolerance on dimensions.

The seals are usually polymeric adhesives and are usually epoxy-based, thus having a solubility for water and a diffusivity that is appreciable. The rate of diffusion increases exponentially with the reciprocal of the width of the seal, as well as in proportion to the seal thickness and the diffusivity constant for the seal material. Seal width is a major contributor to seam width, since there are two seals in a seam width, i.e., one on each tile perimeter. The desired width of seals for individual AMLCD tiles for direct tiling purposes is less than about 0.1 millimeter to eliminate perceptible seams; however, the seals for AMLCD FPDs have only been proven to be reliable for widths of one or two millimeters or wider. This contradiction in requirements is a major problem associated with the existing technology of AMLCD tiles.

There have been at least two general approaches to producing a tiled display with imperceptible seams. The first of these approaches requires the development and production of special tiles with extremely narrow seal widths which must be no more than about 0.15 mm. A number of patents (U.S. Pat. No. 5,889,568, U.S. Pat. No. 5,668,569, U.S. Pat. No. 5,867,236 U.S. Pat. No. 5,963,281, U.S. Pat. No. 5,781,258, U.S. Pat. No. 5,903,328, U.S. Pat. No. 5,593,621) have been filed to describe methods of making invisible seams between tiles according to the above methods and requirements. Despite considerable effort, there does not appear to be any successful efforts in making two-dimensional arrays of seamless tiles according to these methods.

An alternative approach to producing seamless tiled arrays has been described in several patents, U.S. Pat. No. 4,299,447, U.S. Pat. No. 3,909,109, U.S. Pat. No. 4,139,261, U.S. Pat. No. 4,786,139, U.S. Pat. No. 3,853,658, U.S. Pat. No. 5,465,315, and U.S. Pat. No. 5,129,028. These patents describe the use of standard tiles and different architectural designs of fiberoptic structures to eliminate the appearance of seams between the tiles. It does not appear to be practical, or commercially feasible, to fabricate the fiberoptic structures described in these patents. In addition, these fiberoptic structures produce images having contrast which may be inadequate for general use.

Thus there is a need in the art for a means of optically masking the unwanted seam grid created between adjacent display modules arranged in a mosaic array which is practical, economical, and has good image quality.

BRIEF SUMMARY OF THE INVENTION

The present invention pertains to the manufacturing of plastic optical fiber sheets comprising a plurality of polymer optical fibers in the form of a one dimensional array. The optical fiber sheet, or ribbon, can be used for transmitting multi-channel optical signals and can offer the advantage of easy connection. In addition, the sheets may be fused one on top of another to produce a two-dimensional array of fibers suitable for image transmission. The method of manufacture permits the production of a massive block of fiber optical material which provides coherent image transmission up to the edges of the block, good light transmission, high resolution, and low production cost.

The subject invention also relates to an efficient method of manufacture of an image guide composed of a plurality of optical fibers. A specific embodiment which incorporates graded index fiber can overcome the intrinsic limitations of step-index fibers and permit the production of a high light transmission and high resolution image guide. A specific embodiment which incorporates step-index fibers can produce an image guide with improved performance as compared with existing step index image guides.

The subject invention also involves a method for manufacturing a two-dimensional block of polymeric material containing millions of optical fibers. In a specific embodiment, the subject method is a batch process in which a block is thermally fused at a temperature in excess of the polymeric glass transition temperature. Another specific embodiment involves a continuous, high-speed process in which a block is made solid by use of adhesives at a temperature well below the glass transition temperature of the polymers.

The subject method of manufacturing multiple graded index fibers can have a large volume production capacity at low cost. To substantially raise the production rate of the matrix, the surface area of the matrix can be increased so as to provide more efficient cooling of the matrix. Advantageously, the subject method can produce the microfibers in a ribbon or sheet with a larger surface-to-volume ratio rather than, for example, a circular shape.

The subject invention also involves a manufacturing method for producing an image guide with a small cross-sectional area which is suitable for endoscopes or boroscopes. The subject method can also produce a large cross-section plate or beam suitable for large area image transmission for flat panel screens or other industrial, defense, or commercial purposes.

Where previous methods of production of graded index polymer optical fibers often limit the light-gathering power of the fibers, i.e., often limit the numerical aperture of the fibers to typically less than 0.3 and more frequently to less than 0.2, the subject method can produce an image guide with a numerical aperture greater than 0.3, preferably greater than 0.4, and more preferably greater than 0.5. Accordingly, such an image guide can transmit a brighter image due to the larger numerical aperture of the individual graded index fibers.

The subject invention can overcome many of the shortcomings of the previous methods of producing two-dimensional arrays of optical fibers. As an example, the subject invention can involve producing a one-dimensional array of optical fibers. This one-dimensional array can have, for example, a [(1×N) or (2×N) or (a few×N)] array of optical fibers. The fibers may be of the step-index type or may be graded-index fibers. In a specific embodiment, graded-index fiber can be produced by adding low molecular weight additives to polymers. Diffusion of the additive(s) in the polymers during the thermal fusing process can produce a graded index profile in each fiber. A sea material, which may be opaque, can be used to reduce optical cross-talk between fibers. The sheet can then be wound onto a fixture or cut and stacked on a fixture. The layers of the fiber sheets can be fused together under pressure and high temperature.

The method described in the subject invention is appropriate for massive industrial production of multi-core polymer optical fibers (plates) with high coherency of the individual cores.

The present invention relates to a method and apparatus for manufacturing a large, multi-tiled, seamless flat-panel display which has one or more of the following characteristics: high resolution, high contrast, and bright image. The subject invention also pertains to a method and apparatus for the manufacture of low-cost, massive blocks of plastic fiberoptic material composed of a two-dimensional array of optical fibers. In a specific embodiment, the two-dimensional array of optical fibers can transmit an image up to the edges of the block with low or even negligible distortion.

The present invention can utilize blocks of fiber optic material having a two-dimensional array of optical fibers to manufacture fiberoptic modules. These fiberoptic modules can be integrated with standard light-emissive tiles. In a specific embodiment, the integration of these fiberoptic modules with light emissive tiles can produce a two-dimensional, seamless, large flat-panel display.

The subject display can incorporate tiles that have a perimeter of a given width which does not emit light. The central region of a tile, from which light is emitted, can be bonded with an index matching, low modulus adhesive to a fiberoptic plate having parallel large surfaces. The fiberoptic plate can utilize glass or plastic fibers. The optical fibers of the plate can be oriented at a small angle relative to the normal to the light-emitting surface of the tile. For example, the fiber can be oriented between about 10° and about 20°, and typically about 15°. Larger and smaller angles can also be implemented. As a result, the light or image, emitted by the tile and entering one or more fibers oriented at an angle to the normal can be transported transversely relative to the tile by the fiberoptic plate. For a plate about 26 mm thick, the light can be transported a small distance of about 7.0 mm. The transverse displacement of the light, or image, may be made along the x axis, y axis, or along a direction intermediate between the orthogonal axes, for example in the manner described in U.S. Pat. No. 5,129,028. Such plates can be referred to as "image displacement plates" or simply "displacement plates." The displacement plates are preferably manufactured with extramural absorber which absorbs light escaping from individual fibers.

The tiles can be arranged as contiguously as possible, and the fiberoptic plates arranged with respect to the tiles so as to transport each of the images emitted from the tiles in such a manner as to bring the images together to form a seamless image.

In a specific embodiment, four 17" diagonal tiles can be used together with four fiberoptic plates cut in a manner to produce a seamless 34" diagonal image. In this embodiment, the displacement plates can be manufactured such that the projections of the fiber axes on the tile surface are at an angle relative to the horizontal rows, and/or vertical rows, of pixels on each tile so as to point towards the common contiguous point of the four tiles and/or a common contiguous line between adjacent tiles.

In another embodiment, additional fiberoptic plates containing fibers whose axes are normal to the plate surfaces (referred to as "normal plates") can be optically coupled to the previously discussed displacement plates. The normal plates are preferably manufactured with extra-mural absorber which absorbs light escaping from individual fibers. The result of this embodiment is to produce a large display which is spatially seamless and emits light at a constant angle across the tile boundaries. In this embodiment, the displayed image can have high contrast.

In another embodiment of the subject invention, a light diffuser can be bonded to the plurality of contiguous fiberoptic plates. Such bonding can be accomplished with an index-matching, low elastic modulus adhesive. This embodiment can produce a seamless, large panel display with improved uniformity of image brightness at a variety of viewing angles.

The subject invention also relates to the manufacturing process of combining the tiles with the fiberoptic plates, with the necessary optical and mechanical precision and structural integrity.

Furthermore, the subject invention pertains to a method for manufacturing flat-panel displays of arrays of n times m tiles, where n and m are integers.

The subject invention also relates to a method for manufacturing fiberoptic plates.

In a specific embodiment of the subject invention, standard, low-cost AMLCD tiles, with several nun width on the perimeter, can be utilized for producing a seamless, flat-panel display.

The subject invention also involves a method of segmenting a light-emitting large panel into an array of light-emitting small areas. In a specific embodiment, four fiberoptic plates can be used to transmit light received from a light-emitting large panel and transmit the light such that the light is emitted in four sections having visible seams separating the four sections. In a sense, this embodiment reverses the direction of the light with respect to the embodiment which brought four sections together. In a specific application, the light-emitting large panel can be a scintillating screen which emits light when irradiated by ionizing radiation. Four photosensitive light detection devices can be bonded to the four fiberoptic plates. This specific embodiment can provide seamless electronic imaging of an x-ray or other ionizing or non-ionizing flux of energy striking a large area screen.

BRIEF DESCRIPTION OF THE DRAWINGS

FIG. 5A shows a cross-sectional view of an extruded fiber sheet at the exit of die in accordance with a specific embodiment of the subject invention.

FIG. 5B shows a cross-sectional view of an extruded fiber sheet after drawing down in accordance with a specific embodiment of the subject invention.

DETAILED DESCRIPTION OF THE INVENTION

Figure 1:
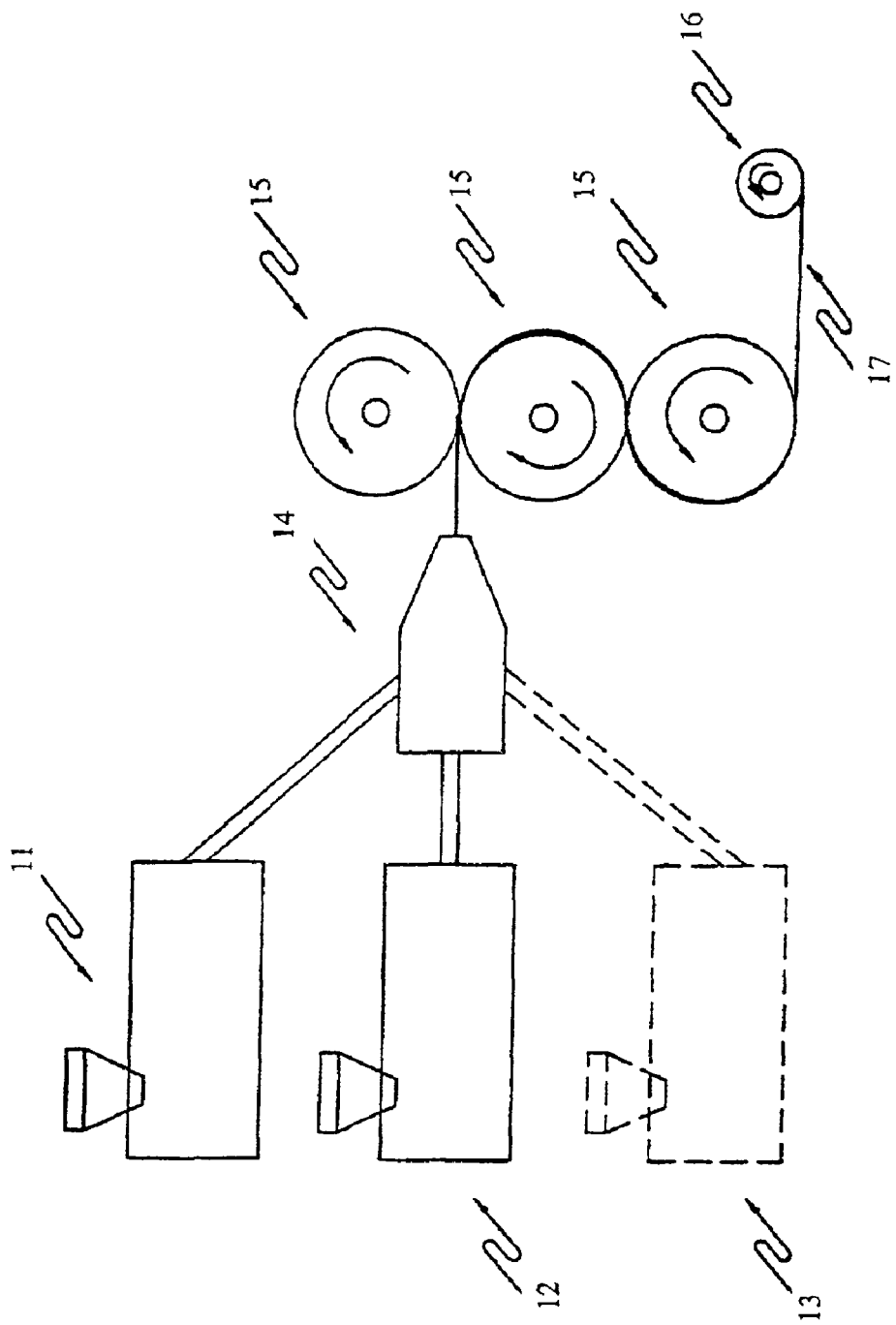
FIG. 1 is a diagram illustrating an apparatus which can be used in accordance with the subject invention for producing multi-core plastic optical fiber sheet.

A specific embodiment of the subject invention involves the production of a sheet comprising a one-dimensional array of optical fibers. Such a sheet can be produced by co-extrusion of a core material and a cladding material through a slit type co-extrusion die, for example, as shown schematically in FIG. 1. Extruder 11 can control the flow of cladding material, and extruder 12 can control the flow of core material, to co-extrusion die 14. Chrome-plated cooling wheels 15 and sheet take up and spooling unit 16 can receive the sheet from co-extrusion die 14. Sheet thickness measuring device 17 can monitor the thickness of the sheet. Optional extruder 13 can be utilized for providing a sea material.

Figure 2B:
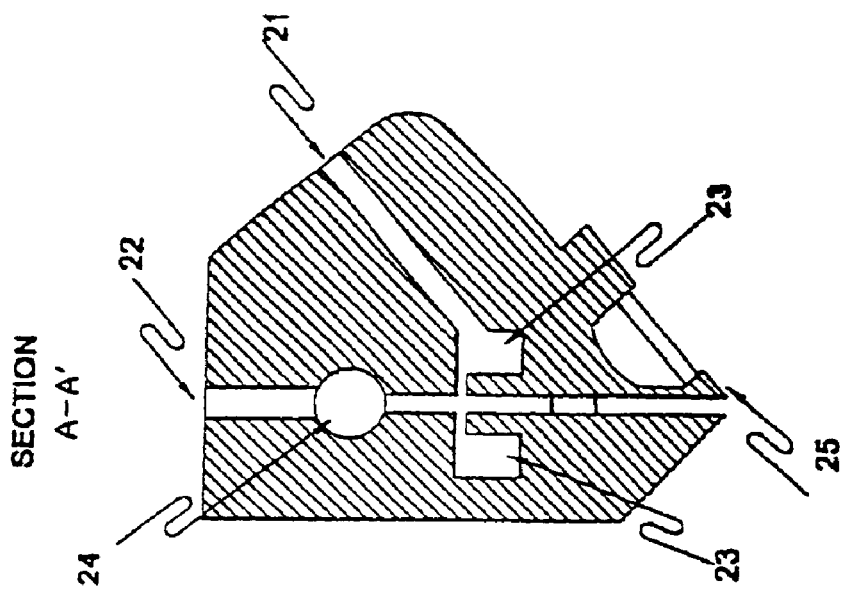
FIG. 2B shows a cross-sectional view of the co-extrusion die of FIG. 2A, through section A–A'.
Figure 2A:
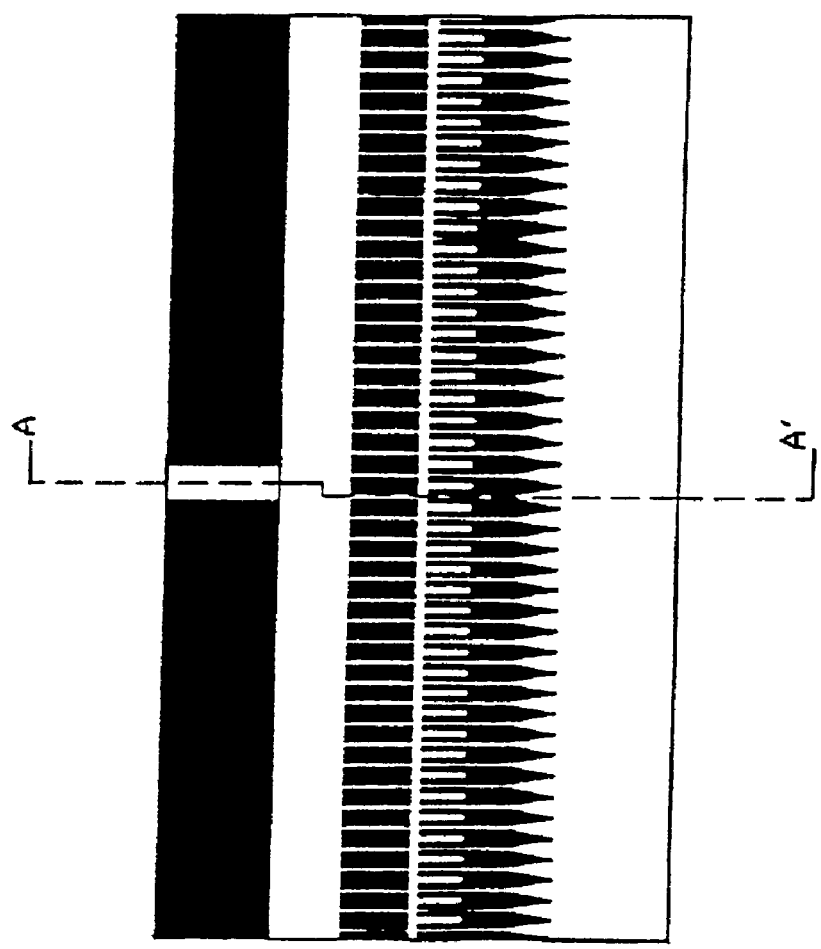
FIG. 2A shows a schematic sectional view of the co-extrusion die for producing multi-core plastic optical fiber sheet in accordance with the subject invention.

Referring to FIGS. 2A and 2B, schematics of two sectional views of die designs which can be utilized in accordance with the subject invention are shown. Feeding port 21 can accept the cladding material and feeding port 22 can receive the core material. Pressure equalizer volume 23 for the cladding material and pressure equalizer volume 24 for the core material can help to equalize the cladding material and core material pressures. Restriction bar element 25 can adjust the gap of different portions of the die lips.

Figure 3:
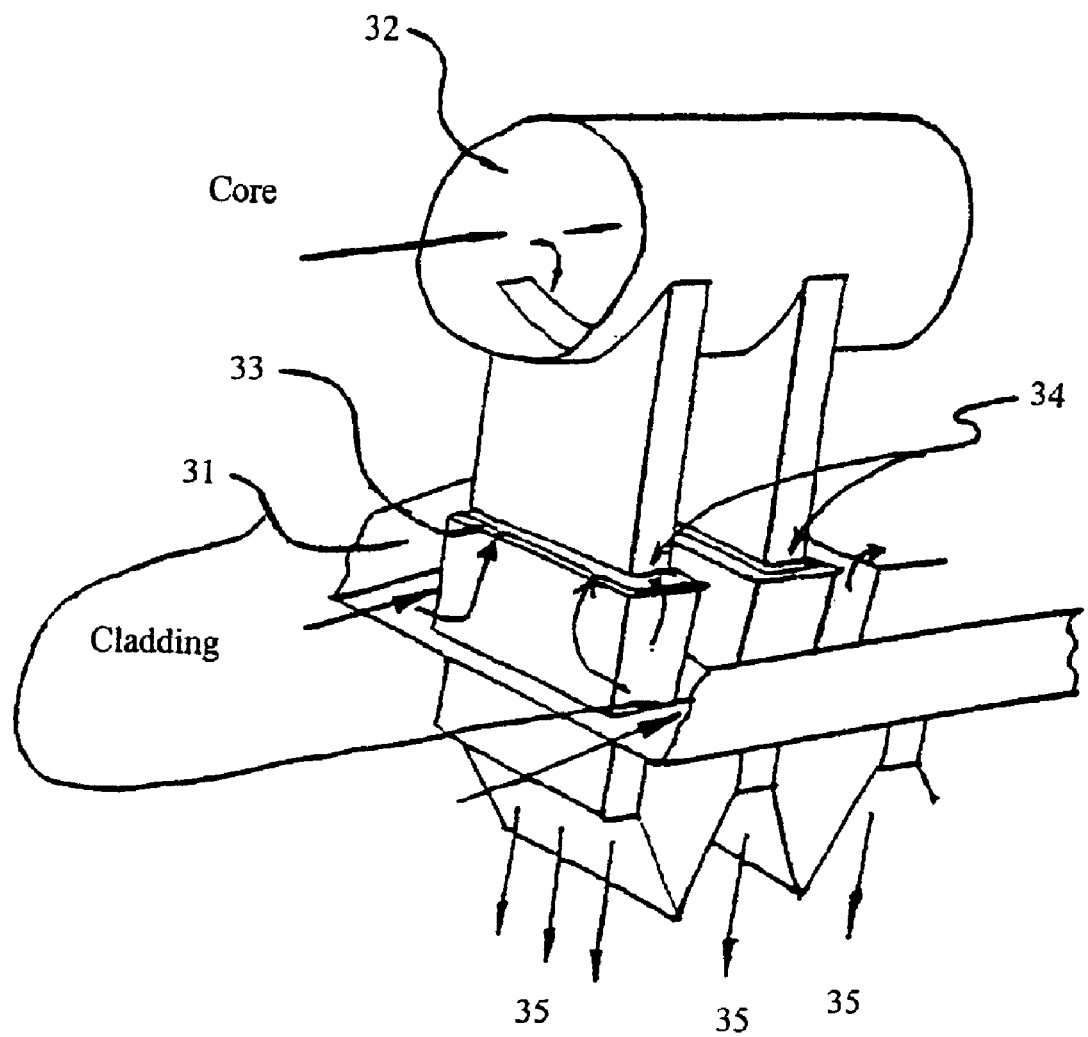
FIG. 3 shows a schematic view of the flow paths of core and cladding materials in the co-extrusion die shown in FIGS. 2A and 2B.

A three-dimensional schematic diagram of a small section of a specific embodiment of a die is shown in FIG. 3. Polymer to be used for forming the fiber core enters the die and establishes an equal pressure along cylinder 32. Likewise, pressure equalizer volume 31 is for cladding material. The pressure equalizers can permit polymer cross flows which tend to equalize pressures along the length of the die, so as to minimize polymer thickness variations along the length of the die. The core polymer exits 32 via a series of slots 34. Cladding polymer enters via pressure equalizer volume 31 and establishes a uniform pressure in the material pool. The cladding polymer exits the pool by flowing over edge 33 and surrounds the core polymer as it flows out of slot 34. The core polymer and its surrounding cladding polymer flow down and merge with the adjacent fibers. Fibers exiting the die shown in FIG. 3 tend to be rectangular-shaped, which tend to form rectangular shaped sheets once merged with the adjacent fibers. The sheet of fibers exit from the die at exit 35, whose gap size can be controlled with, for example, bolts at different points along its length as commonly understood in the art.

Figure 4:
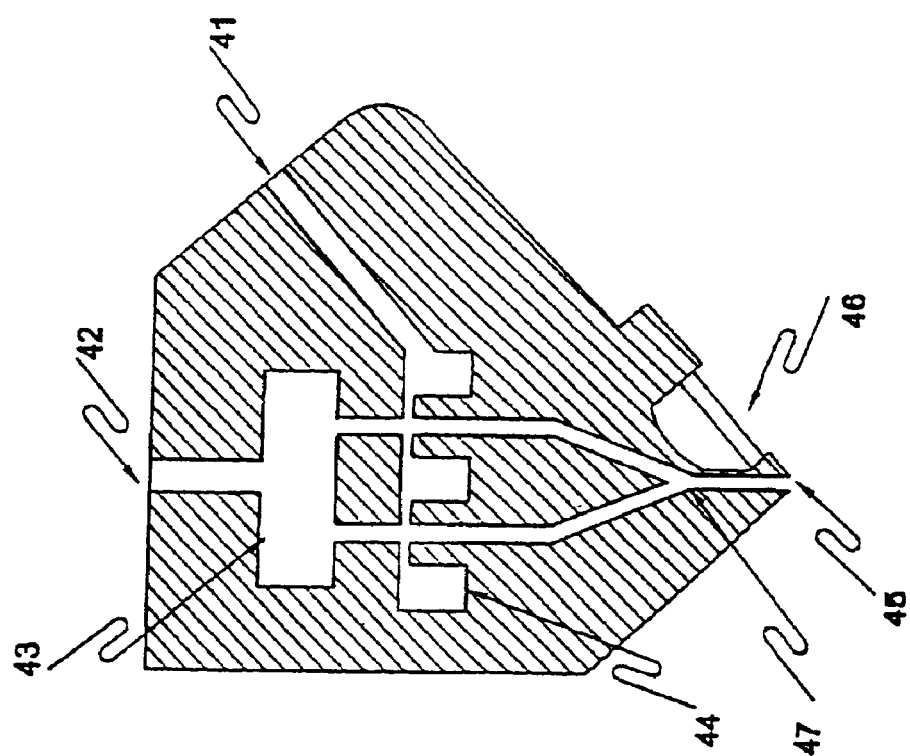
FIG. 4 shows a schematic cross-sectional view of a specific embodiment of a co-extrusion die for producing (2×N) fiber sheet.

The die shown in FIG. 3 can be modified such that two or more rows of rectangular-shaped fibers can be similarly produced. FIG. 4 schematically illustrates a die cross-section where two rows of rectangular core polymer fibers are clad as before and form a continuous 2×N sheet at the die exit 45. Core material input port 42 and pressure equalization tube 43 are for receiving core material. Cladding material enters the die via port 41 and is pressure-equalized in volumes 44. Two rows of clad fibers are produced and fused at intersection 47 before exiting the die at exit 45. The width of the exit slot can be controlled by a row of bolts 46. In the same way, three or more rows of rectangular-shaped fibers may be formed to produce a sheet at the die exit. It will be evident to a person skilled in the art having the benefit of the instant disclosure that different shaped slots, for example, oval or polygonal, can alternatively be used so as to produce a sheet of fibers whose individual shape differs from rectangular.

In the last twenty years, the textile industry has made great advances in the extrusion of multi-microfibers. Spinnerettes have been designed and used which permit the co-extrusion of up to 100,000 microfibers. Examples of patents for multi-component spinnerettes are U.S. Pat. Nos. 5,411,693; 5,562,930; 5,551,588; 5,466,410; 5,344,297; 5,162,074; and 4,406,850, which are incorporated herein by reference. The subject invention can incorporate many of the manufacturing methods of spinnerettes, including for example, the use of photolithography to produce micro-arrays of holes and channels in metal plates which constitute a die.

The material exiting from the subject die can be cooled in order to solidify the material. In a specific embodiment, the material exiting the die can be brought into contact with one or more chilled, highly polished roll 15, as shown in FIG. 1. Contacting such surfaces can cause the material to rapidly solidify. Roll 15 can rotate at a fairly high speed relative to the rate of extrusion from the die lips, so that the material is drawn down. For example, the roll can rotate faster than the rate of extrusion by a ratio of at least 10:1. The shape of the fibers contained in the sheet at the exit of the die is shown schematically in FIG. 5A. After drawn down, the individual fibers assume a substantially round to square shape as indicated in FIG. 5B. Depending on the desired core shape and core-cladding configuration, different dies can be designed to produce sheets of optical fibers with specific cross sections. One example of a resulting cross-sectional area is shown in FIGS. 5A and 5B. Preferably, the materials used for the core and the cladding are transparent polymers. The diameter of the individual fiber cores of the final sheet is preferably in the range of 2–1000 microns. The outer edges at the extremities of the width of the sheet can be trimmed on-line in the production process. Extrusion of single and multi-layer sheet polymer is a well developed technology. Sheet thickness in the range 10 to 300 microns and sheet widths up to 10 feet, is known to those skilled in the art and can be implemented with respect to the subject invention.

Figure 6B:
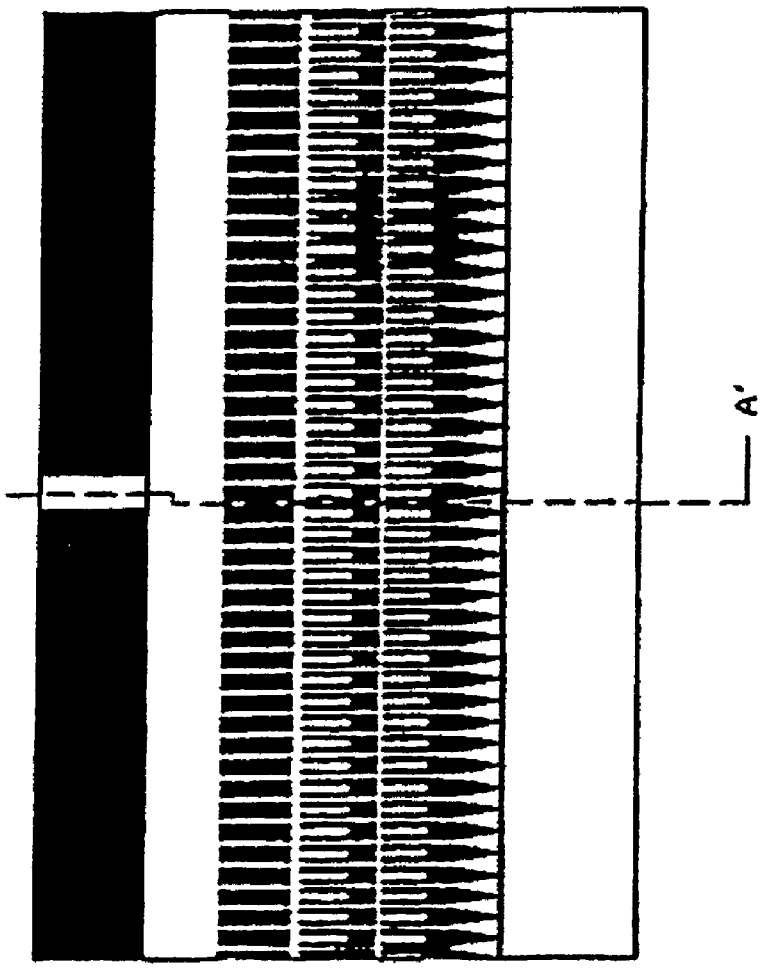
FIG. 6B shows a cross-sectional view of the triple co-extrusion die of FIG. 6A, through section A–A'.
Figure 6A:
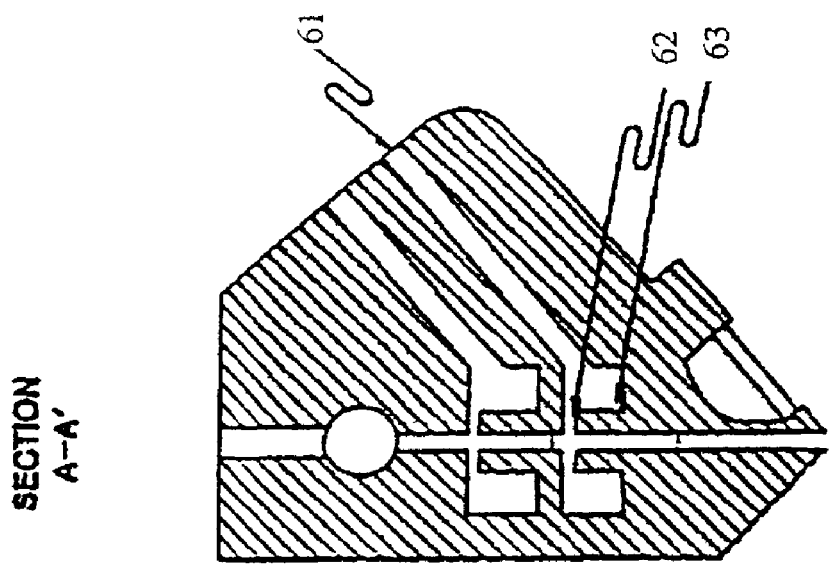
FIG. 6A shows a schematic sectional view of a specific embodiment of a triple co-extrusion die for producing a sea-surrounded, multi-core plastic optical fiber sheet in accordance with a specific embodiment of the subject invention.
Figure 7A:
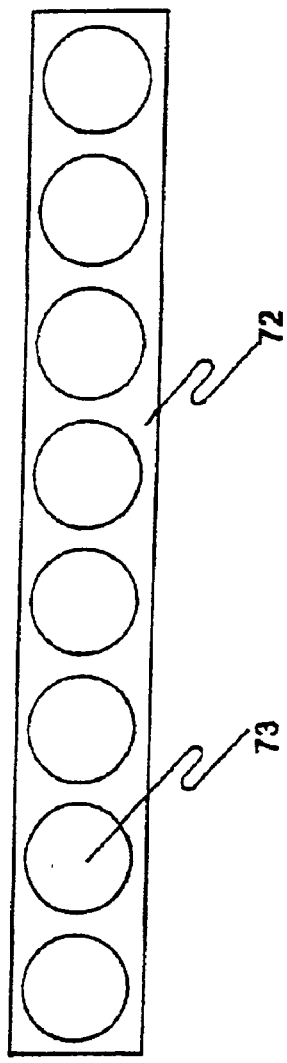
FIGS. 7A, 7B, and 7C show cross-sectional views of a few types of fiber sheets which can be produced in accordance with specific embodiments of the subject invention.
Figure 7B:
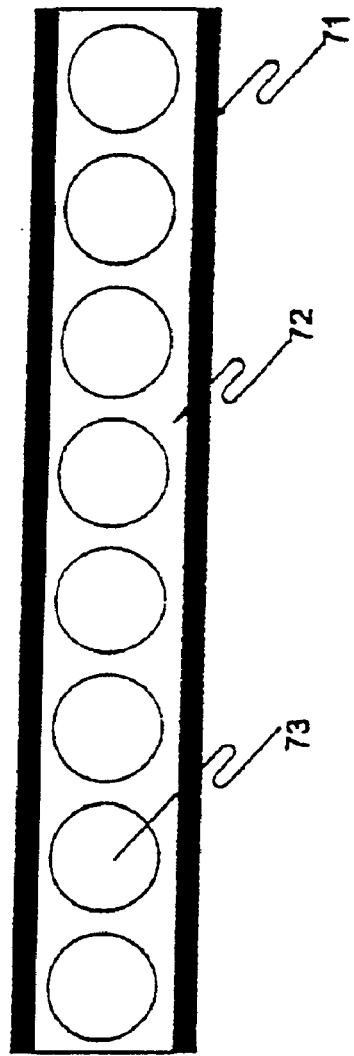
Figure 7C:
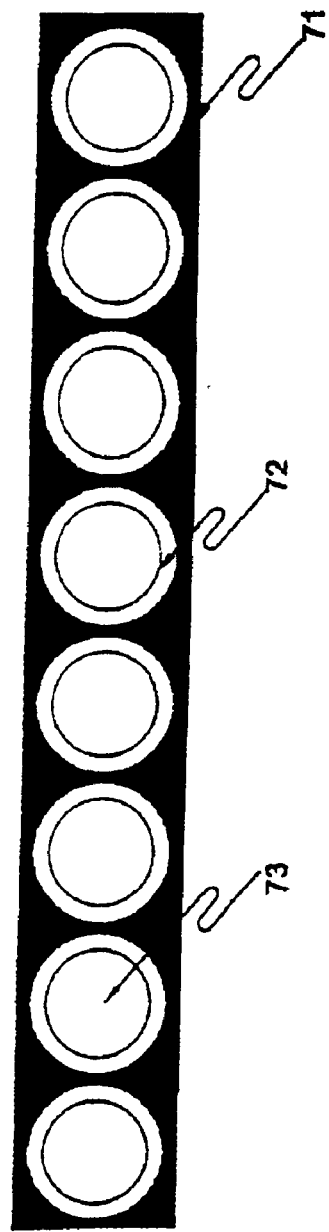

In a specific embodiment, reduced optical cross-talk between fibers is desired, in order to increase the transmitted image contrast. In this case, it has been found useful to co-extrude opaque sea polymer which surrounds each of the fibers. A schematic diagram of a die which permits the production of such a fiber architecture is shown in FIGS. 6A and 6B. The core and cladding structure is produced as before, while a third opaque polymer, the sea polymer, enters the die via port 61. A uniform pressure of the sea material is established in the pressure equalization channel 62 and the sea polymer melt is made to flow over barrier 63 so as to surround the core/clad structure in a similar manner to that of the cladding polymer surrounding the core material. A schematic cross-section of a sheet produced from such a die is illustrated in FIG. 7C. Fiber core 73 is surrounded by cladding 72 which is surrounded by sea material 71. This can be compared to a schematic cross-section of a sheet with cladding surrounding fiber cores having a circular cross-section, for example as shown in FIG. 7A.

Figure 8B:
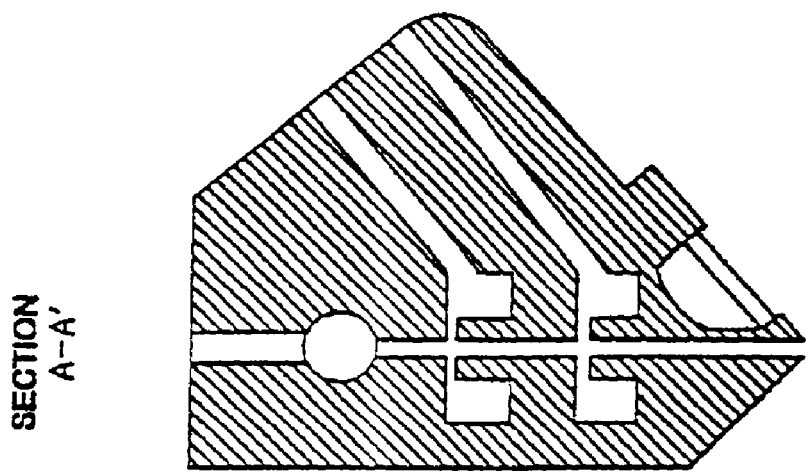
FIG. 8B shows a cross-sectional view of the die of FIG. 8A, through section A–A'.
Figure 8A:
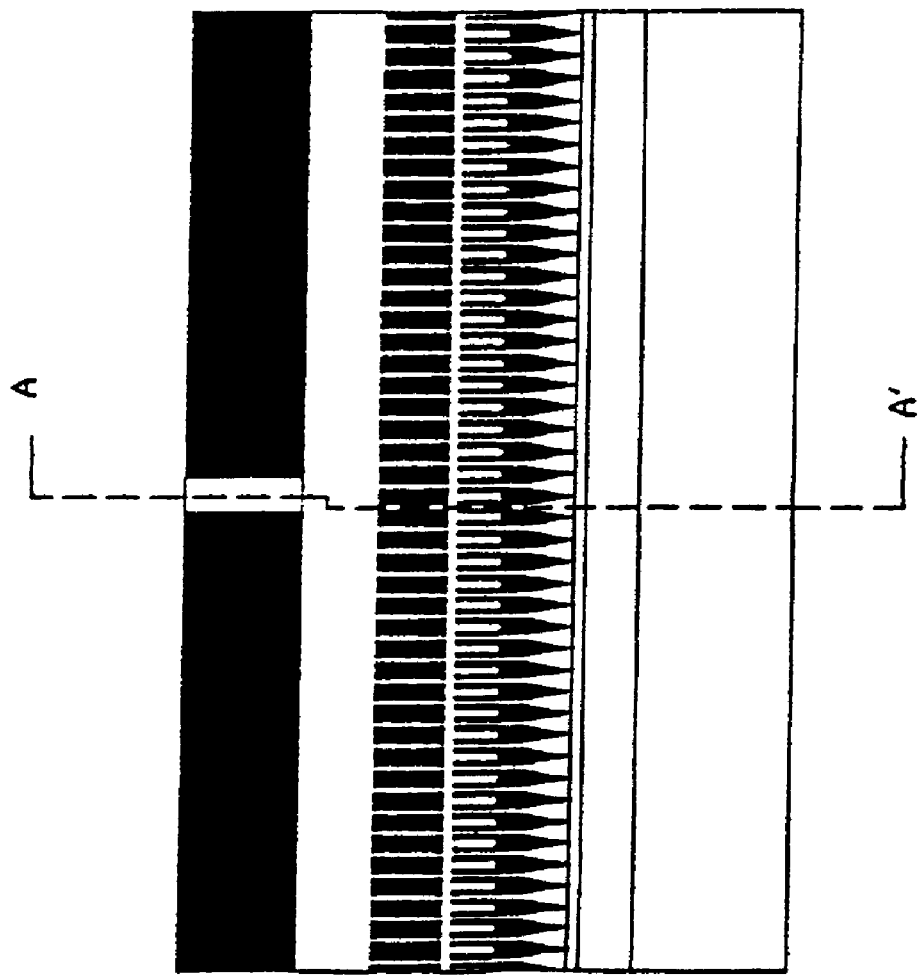
FIG. 8A shows a schematic cross-sectional view of a specific embodiment of a die which extruding sea material on both sides of the fiber sheet.

Employing opaque sea material between every fiber can reduce the fraction of the total area available for light transmission down the fiber cores. If the opaque sea material is applied only on the surfaces of the sheet as indicated in FIG. 7B, the reduction of the fraction of the total area available for light transmission can be lessened. A die design which can accomplish the application of an opaque sea material only on the surfaces of the sheet is shown in FIGS. 8A and 8B. An image transmitting block of material composed of a fused stack of such sheets would have reduced optical cross-talk from sheet to sheet but no reduction within a sheet. This approach may be optimal if a bright image is desired at the expense of reduced contrast.

As discussed, the draw down ratio is frequently quite large for sheet or film extrusion, with a ratio of at least 10:1 being common. Preferably, the subject invention can incorporate draw down ratios in the range 1.5:1 to 30:1. This ratio refers to the change in thickness of the film. The draw down in the width is usually much smaller than the change in thickness. The difference in the die width and the final sheet width is called the "neck-in." During the draw down the outer edges of the width of the film usually thickens, producing what can be referred to as "edge beads". These edge beads can be removed. For example, the edge beads can be removed on-line by a cutter at each side of the film width before final film collection.

In flat sheet production, the neck-in is an important factor to be considered in determining the width of the die, as it determines the width of the sheet that can be fabricated after removing the edge beads. The degree of the neck-in can depend on the rheological properties of the extruded polymers, as well as the fabrication conditions such as the draw ratio and draw span. Typically, the neck-in is a strong function of the polymeric material properties and a weak function of the fabrication conditions. Polymers with an extension hardening behavior (e.g., branched polymers) tend to show a small neck-in, whereas the linear polymers with little extension hardening behavior tend to show a larger neck-in. The neck-in is a phenomenon which generally occurs at the edges, such that the degree of the neck-in is essentially independent of the sheet width.

Figure 9:
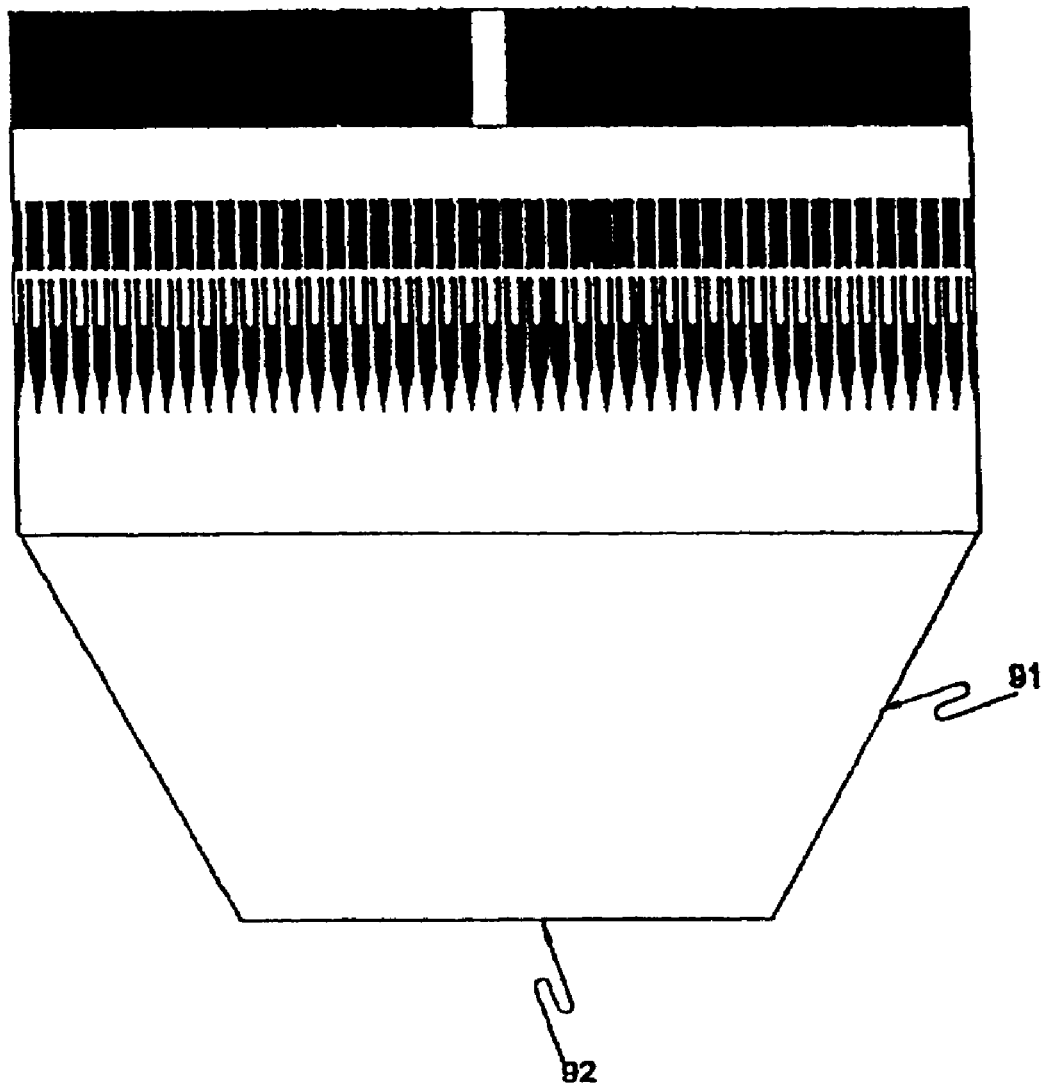
FIG. 9 shows a converging die exit which can reduce the width of a sheet exiting a die in accordance with a specific embodiment of the subject invention.

Accordingly, in a specific embodiment of the subject die, the individual holes in the die can be fabricated in an asymmetric fashion, in order to produce symmetric (for example, round or square) optical fibers in the post-drawn film. In one dimension, i.e., along the direction of the film width, these holes in the die may become small enough so as to pose difficulties in their fabrication. A schematic diagram of a post-die reducer 91 is shown in FIG. 9. The melt material can exit from the die and be reduced in width, but not necessarily in thickness, as it exits reducer section exit 92. The usual draw down ratio may then be applied to the extrudate from the reducer. For a fixed number of fibers per unit width of drawn film, the use of the reducer permits fabrication of wider die holes. This fact can ease the tolerances in die hole fabrication and/or permit the manufacture of film with a larger number of fibers per unit width.

In another specific embodiment of the subject invention a circular tube of sheet can be extruded. The tube can subsequently be slit to produce a sheet. The advantages of this embodiment include the elimination of the edge beads and the ability to achieve a larger drawn-down ratio in the circumferential direction of the tube, easing the die design for very thin core fiber sheets.

It would be apparent to one skilled in the art of polymeric film production, having access to the subject disclosure, that there is a number of variations to the subject method of producing a fiber array in thin sheet or film in accordance with the subject invention.

Figure 10:
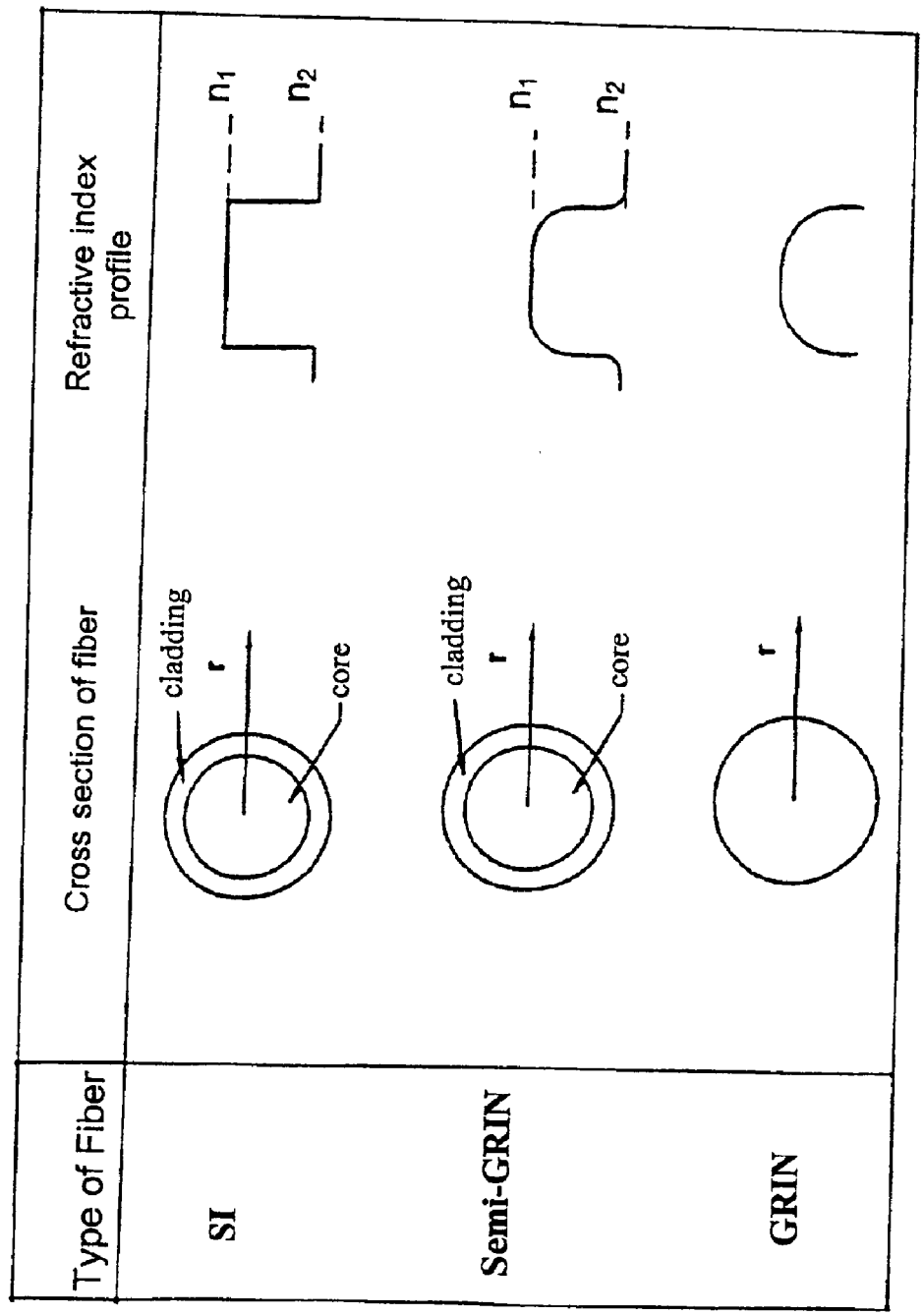
FIG. 10 shows a comparison of the refractive index profiles of a step-index optical fiber, a semi-GRIN optical fiber, and a GRIN optical fiber which can be produced by specific embodiments of the subject invention.

The subject invention can incorporate graded-index fibers into the subject fiber array sheets and other fiber devices. In a specific embodiment, diffusible additives may be added to the core and/or cladding polymers prior to, or during, the extrusion process, in order to manufacture sheets of optical fibers with GRIN or semi-GRIN profiles. Such GRIN or semi-GRIN profiles may allow the subject devices to achieve better light transmission and improved color fidelity. An example of a semi-GRIN profile is shown in FIG. 10. This profile can be particularly useful with fibers having small cores, where scattering at an abrupt core-cladding interface with its intrinsic roughness can cause high light loss. The loss at the core-cladding interface can be high for light with shorter wavelengths, making the semi-GRIN profiles more valuable.

Typical diffusible additives are compounds which are compatible with the mother polymer and have a much lower molecular weight than the mother polymer. The subject invention can utilize diffusible compounds to modify the refractive indices of mother polymers. An additive which increases the refractive index of the mother polymer can be referred to as a "plus" additive, and an additive which decreases the refractive index of the mother polymer can be referred to as a "minus" additive. Additives can be utilized in a variety of ways. For example, the subject invention can involve the addition of a plus additive with the core polymer and no addition of any additive with the cladding polymer, or the addition of a minus additive with the cladding polymer and no addition of any additive with the core polymer. Alternatively, a plus additive and a minus additive can be mixed with the core polymer and the cladding polymer, respectively.

A semi-GRIN profile can then be created in the fiber cores when the materials meet in the die at the melt state, upon diffusion of the additives. Preferably, the type and molecular weight of the additives are chosen to have a high temperature melt state, such that they diffuse in the mother polymers only at elevated temperatures. The degree of additive diffusion during the extrusion process is typically quite small due to the short time involved at the melt state and the typical diffusion coefficients of the additives. If a two-dimensional matrix of fibers is produced by thermal processing and fusing sheets together, there can be substantial diffusion of the additives at that time. Accordingly, the choice of additives and a temperature/time cycle should be chosen so as to obtain the desired final profile. Methods of achieving graded index profiles in single fiber production has been disclosed in a number of patents, for example by Koike, et al., U.S. Pat. No. 5,593,621, which is incorporated herein by reference.

By selecting the types of polymers to be used for the core, cladding, and sea polymers, modifying the structure of the die, and adjusting the extrusion parameters, a plastic optical fiber sheet array can be continuously produced in a variety of designs in accordance with the subject invention.

In a specific embodiment, a transparent diffusible additive which is a non-polymerizing compound, a plastic optical fiber sheet containing graded index fibers with superior transparency can be achieved. Materials which can be utilized as transparent polymers for the core cladding, and/or sea materials include, but are not limited to, polystyrene, polymethyl methacrylate, polyethyl methacrylate, poly-2, 2, 2-trifluoroethyl methacrylate, polybenzyl methacrylate, polycarbonate, polyvinyl acetate, and copolymers containing the above compounds as main constituents with other compounds copolymerizable therewith. Table 1 lists some of these materials with their refractive indices.

In a specific embodiment, polystyrene can be used as the core material and polymethyl methacrylate can be used as the cladding polymer. Copolymers containing the above compounds as main constituents and other compounds copolymerizable can also be incorporated into the core and/or cladding material.

Sea materials utilized with the subject invention can be selected from the materials as stated above and/or other non-transparent materials such as non-transparent polymers. Preferably such a sea material should have similar melt properties to the core and cladding materials. Carbon black and/or other opaque additives may be blended with the sea material to ensure sufficient degradation of optical transparency. The choice of an opaque additive, such as carbon black, should also be made such that minimal diffusion of that additive into the optical fibers occurs.

There are several important criteria for the choice of the transparent, diffusible additive compounds for the core and cladding polymers. Preferably, these additive compounds can diffuse into the polymeric compounds used for the core and cladding. Additionally, the additive compounds are preferably soluble therein. Furthermore, it is preferable that these additive compounds have a boiling point higher than the temperature at which the extrudate exits the die.

Transparent diffusible compounds which can be utilized with the subject invention include, but are not limited to, the phthalic acid series ester compounds, benzoic acid series ester compounds, and the naphthalene series of compounds. These compounds may be used as additives in the core and/or cladding polymeric materials. Examples of some of these compounds and their properties are given in Table 2. It should be noted that there is a wide range of molecular weights of the available additives. The diffusion rate of a given additive depends significantly on the molecular weight and structure of the additive compound. Thus, choice of the additive from Table 2 together with the processing time in the final fusing process can tailor the refractive index profile. Preferably, the additives remain adequately immobile at the use temperature of the final product. The normal temperature range of use for fiberoptic devices is frequently specified as −45° to +70° C. Thus, the additive diffusion should be adequately high at the processing temperatures, typically about 150° C., to produce the desired refractive index profile over the time required for fusing the use temperature.

TABLE 1

Typical Organic Polymers Suitable for the Invention

| Polymer | Refractive Index |
| --- | --- |
| Polystyrene | 1.59 |
| Polymethyl methacrylate | 1.492 |
| Polycyclohexyl methacrylate | 1.507 |
| Polybenzyl methacrylate | 1.568 |
| Poly-2,2,2-trifluoroethyl methacrylate | 1.42 |

TABLE 2

Typical Additives for Organic Polymers Suitable for the Invention

| Additive | Molecular Weight | Refractive Index | Boiling Point (° C.) |
| --- | --- | --- | --- |
| +Additives | | | |
| Diphenyl sulphide | 186 | 1.633 | 296 |
| Benzyl-n-butyl phthalate | 312 | 1.54 | >250 |
| Biphenyl | 154 | 1.587 | 255 |
| Benzyl benzoate | 212 | 1.568 | — |
| 1,2,4,5-Tetrabromobenzene | 394 | 1.61 | mp 180 |
| Triphenyl phosphate | 326 | 1.63 | mp 51 |
| Diphenyl phthalate | 318 | 1.572 | mp 75 |
| −Additives | | | |
| Triethyl phosphate | 182 | 1.405 | 215 |
| Tributyl phosphate | 266 | 1.424 | 290 |
| Glycerol triacetate | 218 | 1.429 | 260 |
| Perfluoro 2,5,8-trimethyl-3,6,9-trioxadodecanoic acid, methyl ester (PTTME) | 676 | 1.295 | 195 |
| Methyl perfluorooctanate | 428 | 1.305 | 160 |

Figure 11B:
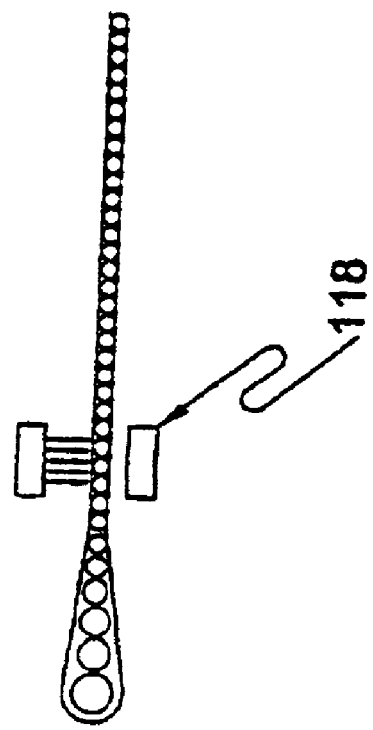
FIG. 11B shows an end on view of the sheet cutting device of FIG. 11A.
Figure 11A:
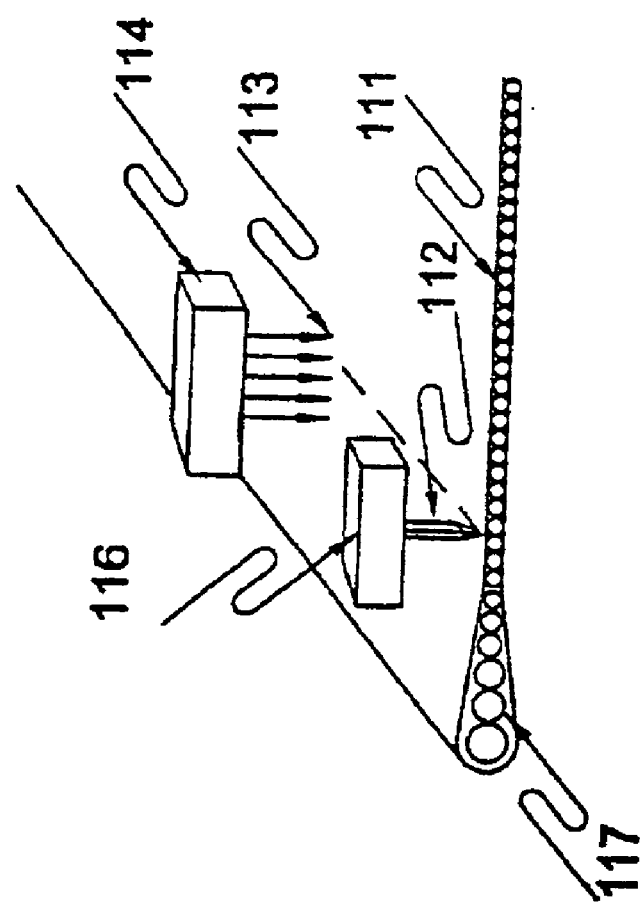
FIG. 11A shows a schematic view of a specific embodiment of a sheet cutting device which can remove the edge beads of a fiber sheet after drawing down.

Preferably, the cutter which removes the edge beads from the subject sheets is designed to cut the sheet in the cladding or sea regions, between cores, in order to ensure optimum light transmission. Prior cutting techniques made it difficult to achieve stability and accuracy in cutter positioning such that the sheet is cut between cores. The subject invention pertains to a method and apparatus for cutting these sheets between cores. FIGS. 11A and 11B show schematic illustrations of a cutting apparatus which may be utilized in accordance with the subject method. Sheet 111 is moving at high speed out of the page in FIGS. 11A and 11B with bead 117 at the left-hand side of the sheet. A source of light 114 produces a beam of light 113 which is transmitted through a region of the sheet. A light detector 118 shown in FIG. 11B, such as a one-dimensional charge coupled device with high spatial resolution, is located close to the opposite face of the sheet. The distribution of light perpendicular to the fiber axes can then be measured and the location of opaque sea material or the transparent core recorded on-line. The transverse position of a downstream blade 112 can then be automatically controlled by actuator 116 to ensure that the blade executes its cut between fiber cores. An additional advantage of the fine blade control is the ability to continually monitor the final sheet width, which can be defined as the distance between the two blades on each edge of the sheet. This method is advantageous when it is desired to have high quality image transmission up to the edge of the sheet, for example, when the sheets are elements of a two-dimensional image transmitting array contiguous with other such arrays. In this situation, it is preferred that little or no seam is seen in the overall image.

In other applications where the two-dimensional image transmitting array is used on its own, such as an endoscope, the transmission ability of fibers at the outer edge of the array may not be of as much importance.

Figure 12:
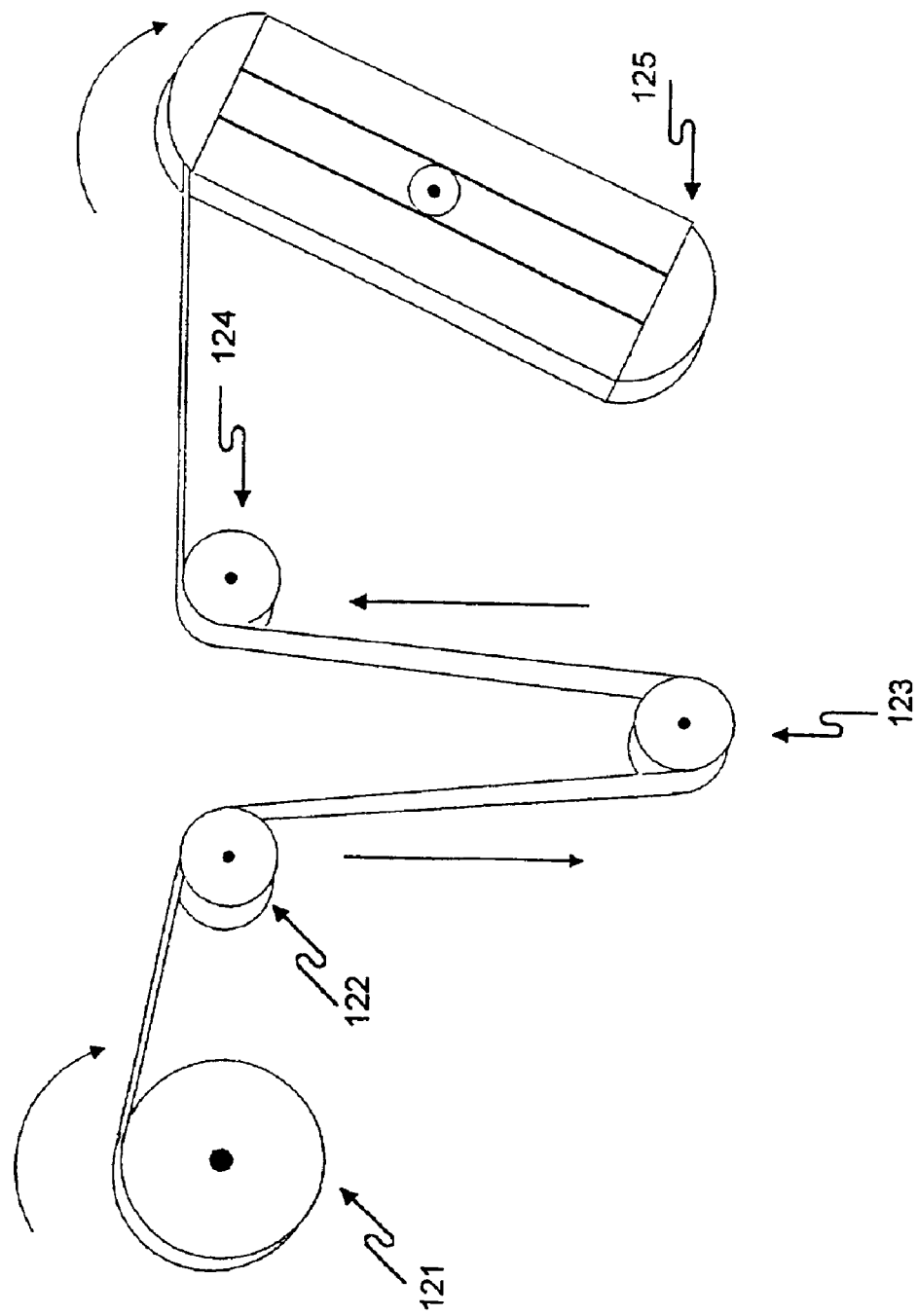
FIG. 12 shows a schematic diagram of a specific embodiment of a sheet-winding apparatus in accordance with the subject invention.

Sheets of the subject one-dimensional array of optical fibers can be wound, as shown schematically in FIG. 12. Preferably, such winding is accomplished under clean room conditions. FIG. 12 illustrates the winding of the sheet onto stainless steel fixtures with square or rectangular cross sections. The fixtures of FIG. 12 are shown schematically in FIG. 13. Two straight fixtures are coupled together back to back to form a rotating spool. The winding process is optimally done on-line to minimize the accumulation of dust. However, the process may also be performed at a later stage. Referring again to FIG. 12, the sheet is unwound from spool 121 through a system of rollers 122, 123, and 124, where the vertical height of the roller 123 is self-adjusting depending on the tension in the sheet. The spooler 125 rotates about its axis as shown and winds the sheet onto the two long fixtures which are arranged on its long sides. Again, the interrelation of the two long fixtures with the spooler 125 is shown in more detail in FIG. 13. Long square, or rectangular, fixtures 131 are connected back to back on to the spooler body 132 which rotates about its axis 133. Each end of the spooler has semi-circular guides 134 which help maintain the precise positioning of the sheet in the spooler as the sheet is being wound up. Accordingly, when the fixtures are mounted onto spooler 125, there is a smooth channel all the way around to receive the sheet as it is being wound up. Preferably, the width of the plastic sheet is maintained as close as possible to the width of fixtures 131 which accept the sheet. In this way, the sheet can be wound and guided by the fixture to seat precisely on top of the previous sheet layer. In practice, three, four, or more fixtures can be installed onto an appropriately shaped polygonal rotating frame to facilitate smooth winding.

Figure 14:
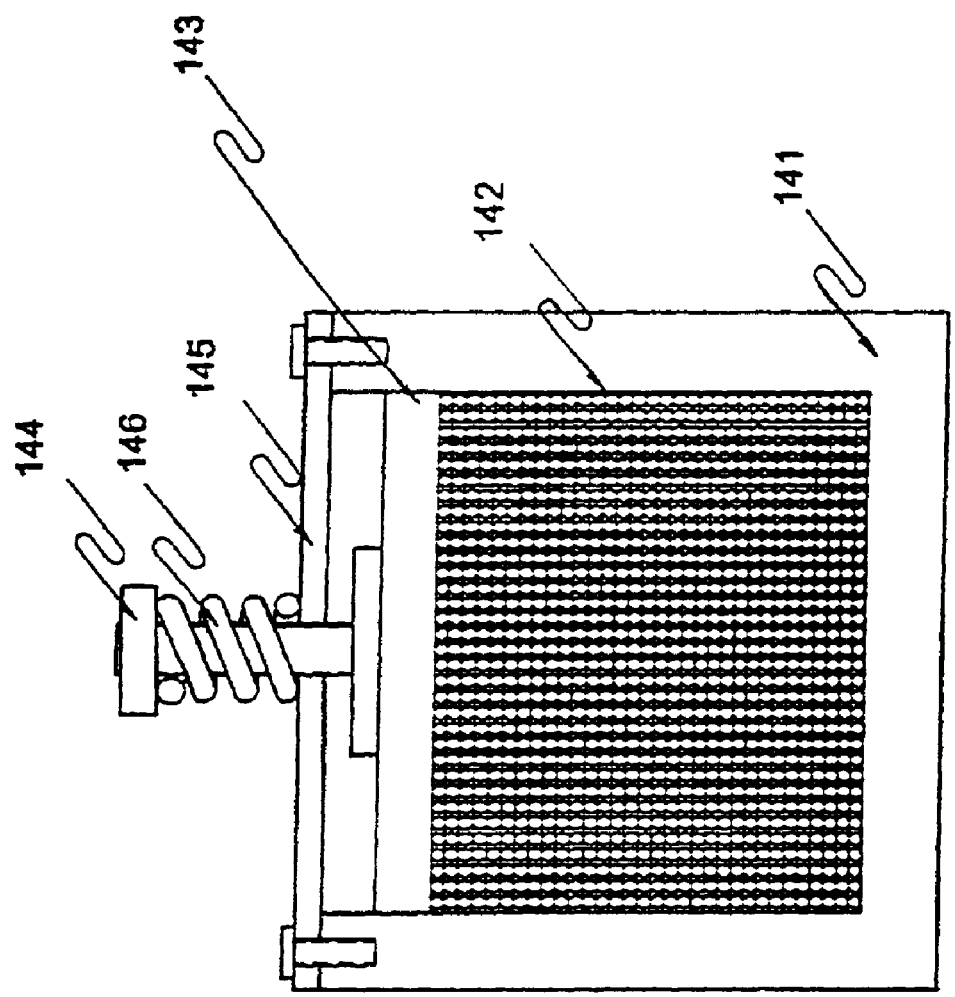
FIG. 14 shows a schematic diagram of a specific embodiment of a compression fixture which can be used in the fusion of fiber sheets to form a solid block.

Once the desired number of layers of sheets has been accumulated on top of each other, the winding process is stopped. A cover plate 143 can then be placed on the top of each fixture, as shown in FIG. 14. Preferably, cover plate 143 can apply uniform pressure on the fiber sheets. A cross-section 141 of fixture 131 is shown in FIG. 14. The stacked sheets 142 are shown as being subjected to pressure by cover plate 143 via a series of bolts 144 located along the center line of the fixture. The bolts can be torqued to a given level to produce the desired uniform pressure on the stack of sheets. This force is maintained by the bridge 145 which is mounted on the fixture 131 for the purpose of establishing compression. All the polymer contacting surfaces on the fixture and cover plate can be coated or lined with a nonstick surface, such as TEFLON (registered trade mark of E. L DuPont de Nemours & Company) to facilitate easy removal of the fused polymer block from the fixture.

The multiple layers of sheets can then be cut at the ends of the fixtures and the fixtures can be disassembled from the rotating frame. The sheets can then be dried in a vacuum oven at an elevated temperature. The drying temperature should be kept below the glass transition temperature of the sheets, and preferably about 20–50° C. below the glass transition temperature of the sheet material. The temperature can be slowly increased. At a temperature of about 20–60° C. above the glass transition temperature of the sheet material, the sheets of fibers can fuse together under pressure into a solid block. If the sheet has graded index fibers which use additives to accomplish the index profile, the time and temperature cycle is selected so as to effect the proper diffusion of the additives within the core and cladding, and between the core and cladding polymers. The oven can then be allowed to cool down to room temperature, and the fused boule removed from the fixture.

In another embodiment, the sheets are adhered to each other by applying a thin layer of adhesive to the sheets. This adhesive an be applied, for example, in the form of a thin sheet, spray, or other means before the next sheet is placed upon it. It is advantageous, but not necessary, to exert pressure to ensure the removal of all air and water vapor from between the sheets. The glue may be set by, for example, thermal means, ultra-violet radiation, x-ray radiation, oxygen activation, pressure, or other methods as is known in the art of adhesives. Advantageously, this manufacturing method does not require the boule to be raised to a temperature in excess of the polymeric glass transition temperature, thus saving time and energy. For a range of applications where the distance for transmitting the light is limited, for example less than 100 cm, and/or individual fiber diameters are quite large, for example greater than 20 microns, it has been found that step-index fibers perform satisfactorily. Accordingly, this embodiment may be a cost effective method of producing such two-dimensional blocks of fibers. In addition, this embodiment is a continuous, high-speed process.

Fused or glued boules manufactured from multiple sheets in accordance with the subject invention can have cross-sections of 2 fibers×2 fibers up to 100,000 fibers x 100,000 fibers, or even larger. Individual fibers contained within the boules may have transverse dimensions in the range of 10 microns to at least 1,000 microns. Furthermore, these boules can be fused or glued to additional like boules to form larger boules, and/or can be drawn or stretched to form boules having individual fibers with smaller cross-sections.

Figure 15:
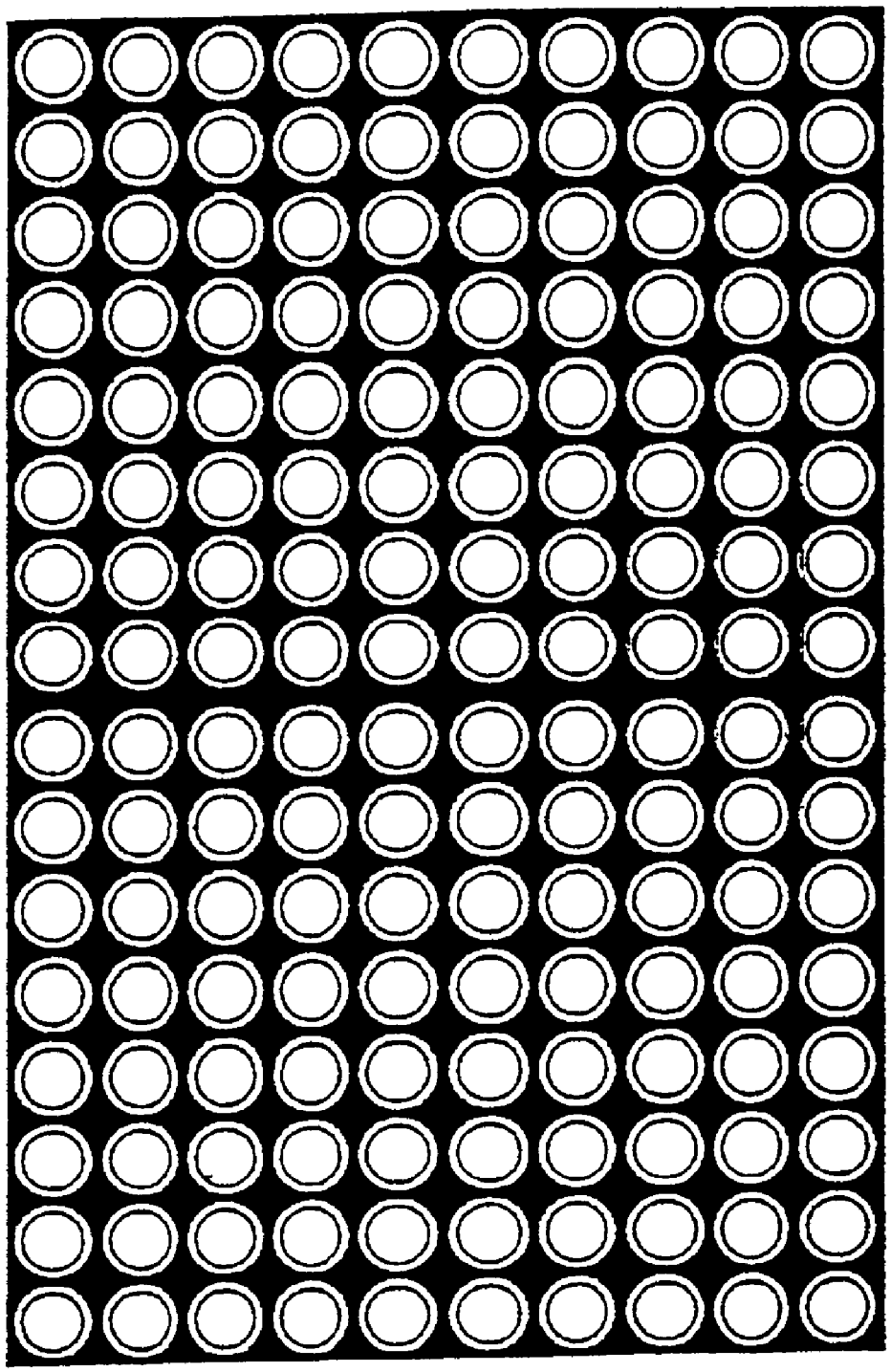
FIG. 15 shows a cross-sectional view of a two-dimensional matrix of optical fibers in accordance with the subject invention.

The two-dimensional fiber matrix boule may then be cut and polished into the desired sizes for specific applications. A schematic of a small region of the cross-sectional view of the fiber matrix is shown in FIG. 15.

In certain applications, such as medical endoscopy and industrial boroscopes, there is a need for an image guide. Such a guide may be defined as a two-dimensional array of optically transmitting microfibers. Typically, such guides are in the range of 0.3 to 5 mm in transverse dimension. The transverse dimension of the individual microfibers is typically in the range of 2 to 50 microns. The shape of the microfibers may be, for example, round, triangular, square, or higher polygonal. Furthermore, the microfibers may be step-index, semi-GRIN, or GRIN. The subject invention relates to such image guides and a method of making such image guides.

The subject invention pertains to a method of fabricating a two-dimensional array of fiber. Such a two-dimensional array of fiber can be referred to as a multi-fiber preform. The subject method can produce a preform without the traditional need for fiber stacking which can be labor-intensive and costly. After fusion, the preform is normally square but may be machined to have a circular or polygonal external shape depending on the desired shape of the final image guide. This preform can then be mounted in a draw tower where the bottom of the preform is heated in an oven as is well known in the art. The bottom of the preform drops and fiber can be pulled in the usual way. In a specific situation where the preform is an N×N array with outer dimensions of 60×60 mm$^2$, a final drawn fiber of 2×2 mm$^2$ will contain an N×N array of microfibers, the transverse dimension of which is reduced by a factor of 30. In this way, image guides containing microfibers with transverse dimensions down to, for example, 2.0 $\mu$m may be fabricated.

The subject method can produce large two-dimensional arrays of plastic fiber optics with minimal image distortion and blemishes. Existing technology stacks a plurality of small diameter (<3 mm) image guides containing microfibers to produce a large two-dimensional array. The small diameter image guides are typically square in cross-section to minimize voids. The minmization of voids is preferable to reduce the transverse movement of microfibers during the fusing process, Such transverse movement will typically occur when, for example, round image guides are stacked and fused. Transverse movement of microfibers leads to image distortion which is highly undesirable. However, the high-speed winding of a square image guide with a width of less than 3 mm to produce a two-dimensional array is a very difficult process to perform with precision positioning of the image guide. A primary reason is that the image guides offer no "self-centering" mechanism as exists with round image guides or a sheet. When winding such square image guides, the square image guide being laid down sometimes lands on the edge of the prior positioned square image guide and, consequently, can twist as it is laid into place. The voids created by this twisting produce major movement of microfibers during the fusing process, resulting in image distortion and/or blemishes in the final boule product.

The subject invention can overcome the above problems by producing a sheet of 1×N, 2×N, or m×N fibers, where m<<N. The width of the sheet can be maintained essentially equal to the width of the winding fixture during the cutting process. In this way, the sheets are wound on top of each other in the fixture and are self-centered as they settle into the fixture. Thus, coherency of the fiber array is achieved at each end of the fixture, minimizing image distortion and blemishes.

As discussed, the existing manufacturing technology uses a two-dimensional array of small (<3 mm) image guides. The microfiber-to-microfiber distance inside an image guide is uniform, but it is very difficult to make the distance between nearest microfibers in adjacent image guides uniform, or uniformly equal to the microfiber-to-microfiber distance within each image guide. Any inequality in these two distances gives rise to the image artifact known as the "chicken wire" effect. The characteristic of this image is a regular square-seamed pattern across the entire image area. The subject invention can reduce, if not eliminate, this image artifact entirely by the use of sheets of fibers. Since the thickness of the sheet is typically in the range of 25 to 250 microns, any line pattern of seams is on a spatial scale too small to be easily seen in the transmitted image.

In the existing technology, each microfiber typically has a step-index refractive index profile. As discussed, the subject invention can be implemented using either step or graded-index microfibers. Light transmission at all wavelengths is improved with the use of graded-index fibers. In addition to superior image brightness, the color fidelity can be improved with the use of graded-index fibers.

Due to the ease of cooling the sheet as it exits the die, the manufacturing production rate of the subject method can be high. Prior technology is typically able to produce an image guide with a diameter ≦3 mm, a cross-sectional area ≦9 mm² and a circumferential distance of about 1 cm. The limitation on these arises from the need for adequate cooling. A specific embodiment of the subject method has a typical extrudate sheet with a 1 meter width and a 250 micron thickness for a cross-sectional area of 250 mm², and a surface perimeter of about 200 cm for cooling purposes. This corresponds to a potential factor of more than 200 increase in cooling capacity per volume because of exposed surface area and improved conduction within the polymer because of smaller transverse distances. Accordingly, between a 100 and 1,000 fold increase in production rate can be achieved for fiberoptic material with the subject method.

The subject invention also pertains to a method of fabricating tiled, flat-panel displays having seams between the tiles which have low, or negligible, perceptibility. Standard production individual tiles incorporating active matrix liquid crystal displays (AMLCDs) can be used. These standard production AMLCD's can have several millimeter wide perimeters. The subject method can reduce, or eliminate, these non-luminous perimeters between the tiles in the display.

Figure 16:
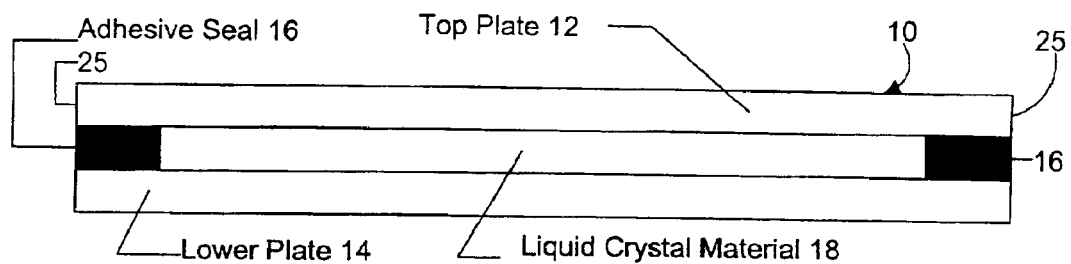
FIG. 16 illustrates a cross-section of a typical active matrix liquid crystal display tile.

Referring to FIG. 16, a typical tile 10 is shown with a simple sealing arrangement. The top glass plate 12 and lower glass plate 14 are separated by an adhesive, peripheral seal 16. Active crystal material 18 is disposed in the space created by plates 12 and 14 and seal 16. For purposes of description herein, liquid crystal technology is referred to in order to describe design and manufacturing elements of the subject invention, but the subject invention is not intended to be limited to AMLCDs. The teachings may be applied to other flat-panel displays, such as plasma displays (PDs), Super Twisted Nematic (STN) LCDs, field-emission displays (FEDs), electroluminescent displays (ELDs), organic light-emitting displays (OLEDs), and digital-mirror displays (DMDs). Not all of the design elements are included herein (such as color filters, light shields, polarizers, electrodes, light valves and electrical connections).

Figure 17:
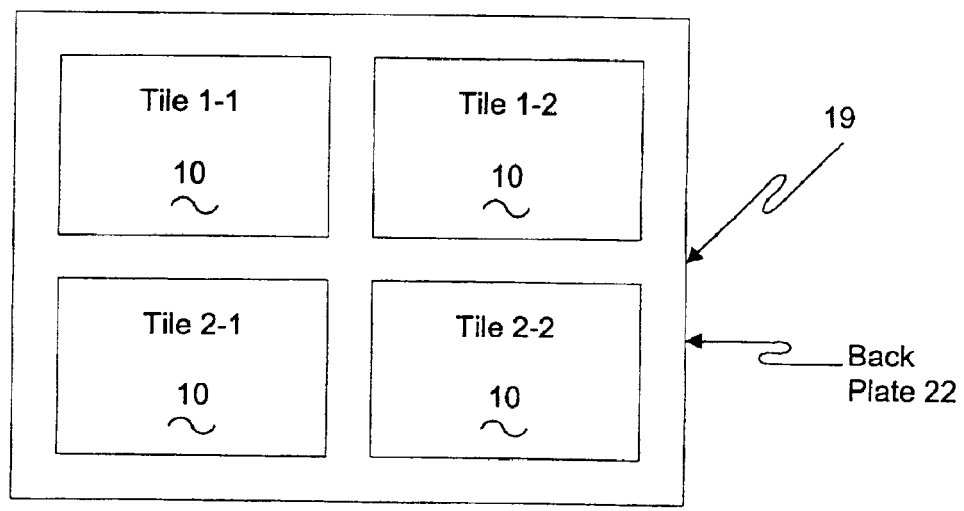
FIG. 17 shows a mosaic of tiles having gaps to allow for electrical readout.
Figure 18:
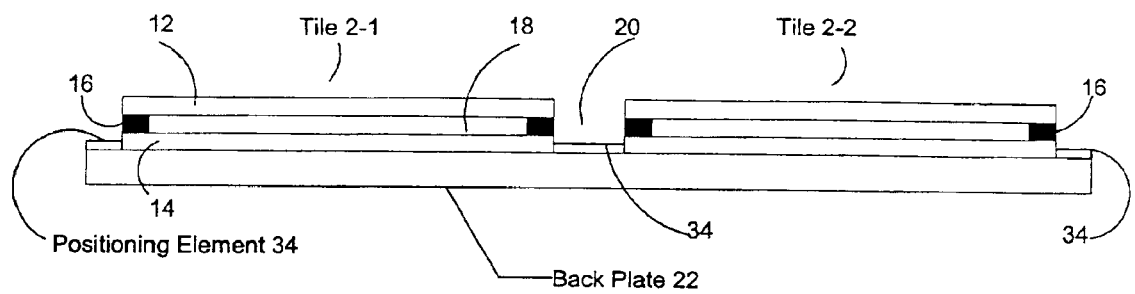
FIG. 18 shows a side view cross-section of the tiles shown in FIG. 17.

FIG. 17 shows a plan view of a 2×2 tiled, flat-panel display 19. FIG. 18 shows the side cross-sectional view thereof. Each tile 1-1, 1-2, 2-1 and 2-2, shown in FIGS. 17 and 18 is similar in cross-section to tile 10 shown in FIG. 16. In addition to the tile structures shown in FIG. 16, a back plate 22 can be utilized to provide mechanical support for the four tiles 10 and can permit them to be accurately positioned using positioning elements 34 rigidly located relative to the back plate. It is not necessary to glue or connect the tiles to plate 22. The gap 20 between each tile can provide space for electrical connections, spacing for tile extraction for reworking, if so desired, and location tolerances. The construction, design, manufacture and function of tiled, flat-panel displays are described in detail in U.S. Pat. Nos. 5,661,531 and 5,889,568 issued on Aug. 26, 1997, and Mar. 30, 1999, respectively, and are hereby incorporated by reference.

The image seam width, illustrated in FIG. 18 between adjacent luminous pixels in tiles 2–1 and 2-2, is twice the width of seal 16 plus the width of gap 20.

Figure 19:
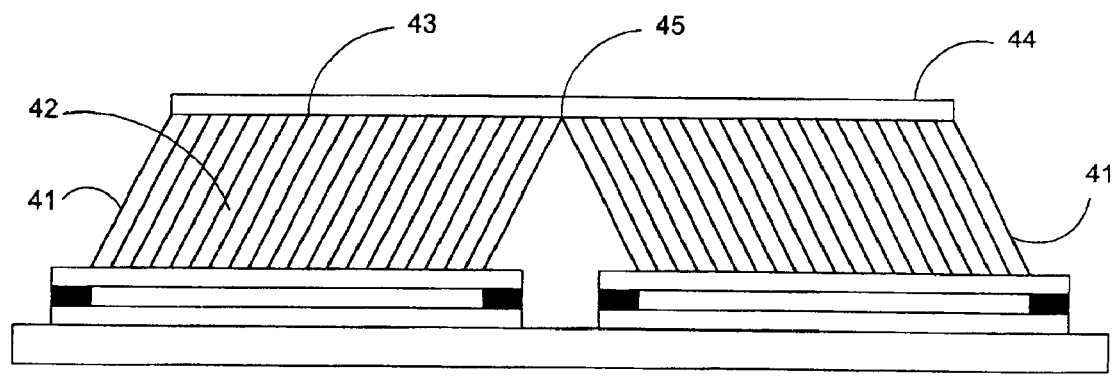
FIG. 19 shows a side view cross section of the tiles shown in FIGS. 17 and 18, with superimposed fiberoptic plates which translate the emissive areas of the tiles into contiguity.

FIG. 19 shows a side cross-sectional view of the tiles depicted in FIG. 18 together with two fiberoptic plates 41 in accordance with the subject invention. The width of the fiberoptic plates can be made equal to the width of the light-emitting region of the tiles. The fibers 42 are depicted in FIG. 19 at a small angle relative to the normal to the tiles. Preferably, the angle fibers 42 make relative to the normal of the tiles is between about 10° and about 20°. The thickness of the plate 41 can be designed such that the displacement plates come together, and their faces 43 form a single-plane surface 43.

The angular divergence of the light emitted from the emissive surface of a tile depends on the specific tile technology. For example, a typical LCD tile emits light in an angular range of +100 to +40°, depending on its design. However, an OLED tile emits light over an angular range of +90°. Thus, there are large variations of light emissive angular ranges depending on the type of tile employed. The technology disclosed herein is able to accommodate the use of all types of tile and yet produce a bright, seamless, and high contrast image. The contrast can easily be degraded by a poorly designed fiberoptic system. When light emitted from the tile is beyond the acceptance angle of the fibers 42, that light can pass from fiber to fiber and can exit at some location on the final image. This light which is not guided by a fiber 42 reduce the contrast of the image. The ratio of tile-emitted light intensity beyond the fiber angular acceptance which is subsequently transmitted to the final image plane, to the intensity contained within the fiber angular acceptance is a good measure of the final image contrast. The contrast defined in this way depends principally on the type of the tile as discussed above, and the numerical aperture of the fibers, but can be anywhere in the range 20% to more than 100%. It is desired to have this ratio be less than 5% and preferably less than 2%.

In a preferred embodiment of this invention, there is an extra mural absorber around either individual fibers, or rows of fibers, of the fiberoptic plates. The extra mural absorber can absorb much, if not all, of the light which is not transmitted by the optical fibers, but exits from the sides of the fibers. The extra mural absorber can perform one or more of at least two functions: (1) the extra mural absorber can act as a second cladding polymer with lower refractive index than the standard cladding polymer; (2) the extra mural absorber can act as a light-absorbing medium when light escapes from a fiber. By acting as a second cladding, the extra mural absorber can substantially increase the numerical aperture of the fiber, such that the angular acceptance of the fiber can be as large as, for example, about ±60°. This increase in the numerical aperture can enable a bright, large viewing angle of the final image of the display. By absorbing the light exiting the side of the fiber, the contrast of the image can be enhanced. These two functions can be achieved simultaneously when the refractive index and the light absorption coefficient of the extra mural absorber are chosen carefully.

In a specific embodiment, an extra mural absorber material can be selected from the partially fluorinated methacrylates, for example, trifluoromethylmethacrylate. The refractive index of this polymer is 1.41, has good adhesion to the preferred fiber cladding materials. In a specific embodiment, trifluoromethylmethacrylate can be used as an extra mural absorber with fibers having a cladding made of polymethylmethacrylate with index=1.49. The light transmission of the extra mural absorber can also be made such that there is low, or negligible, loss of light which is transmitted through a fiber but severe light loss when light transmits from fiber to fiber. The choice of materials used in the fibers can impact the performance of the subject fiberoptic plates. In a specific embodiment, the transparent polymers for the core and cladding materials may be selected from polystyrene, polymethyl methacrylate, polyethyl methacrylate, poly-2, 2, 2-trifluoroethyl methacrylate, polybenzyl methacrylate, polycarbonate, polyvinyl acetate and copolymers containing the above compounds as main constituents and other compounds copolymerizable therewith. Table 1 contains some of these materials with their refractive indices. The available polymers are not limited to those listed.

In a specific embodiment, polystyrene can be used as the core material and polymethyl methacrylate can be used as the cladding polymer. Also copolymers containing the above compounds as main constituents and other compounds copolymerizable therewith can be used.

A sea polymer can be selected from the materials listed in Table 1 or from other non-transparent polymers. It is preferable for the sea material to have similar melt properties to those of the core and cladding materials. Carbon black or other opaque additives may be blended with the sea polymer to reduce optical transparency. It is preferable that the opaque additive, such as carbon black, be selected so as to result in low, or minimal, diffusion of that additive into the optical fibers.

In FIG. 19, the light transmitted by fiberoptic plates 41 emerge at surface 43 with angular divergence of ±30 degrees as determined by the numerical aperture, about 0.5, of the fibers. Furthermore, the central angle of the emergent light is different from each tile. The light emerging at surface 43 from the two displacement plates depicted in FIG. 19 are at +15° and ±30°, and −15° and ±30° relative to the normal of the plane. Thus, there is a discontinuity of 30° at point 45, in the central angle of light emission from surface 43. Since the discontinuity angle, 30°, is comparable to the range of emission angles, ±30°, there can be a marked change in perceived image brightness across point 45 when the surface 43 is viewed at any angle other than normal to the surface. For this reason, a light diffuser 44 can be optically bonded to surface 43. Light diffuser 44 can enable the angular dispersal of the emergent light over a broader range, such as ≧±60° from the normal to the surface 43. Accordingly, light diffuser 44 can provide an angular range which is adequate for viewing the large flat panel display. However, in some circumstances, there may still be some discontinuity of brightness across an interface depicted as point 45.

Figure 20:
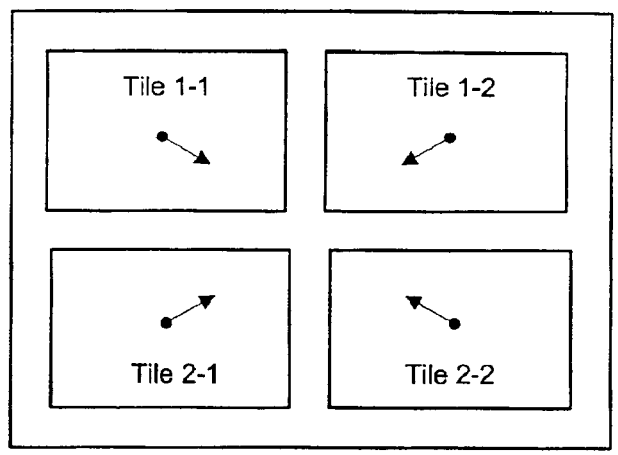
FIG. 20 shows the plan view of the array of four tiles shown in FIG. 17, with arrows indicating the planar projected directions of the optical fibers within the fiberoptic plates which are superimposed on the tiles in FIG. 19.

FIG. 20 shows a plan view of the four tiles depicted in FIG. 17 and, in addition, the planar projected directions (indicated by the arrow directions) of the optical fibers contained in the fiberoptic plates bonded to each tile. In each case, in this embodiment, the arrows are directed at the central point of the final image display. In the embodiment shown in FIG. 20, the spacing between tiles 1-1 and 1-2 is the same as the spacing between tiles 1-1 and 2-1 and the central point of the final display image is equidistant from each of the four tiles. Other embodiments are possible as well. For example, the planar projected direction of tiles 1-1 and 1-2 may be pointing directly toward the other and the planar projected direction of tiles 2-1 and 2-2 would then be longer and skewed up toward tiles 1-1 and 1-2. It is clear that many other combinations are possible as well.

Figure 21:
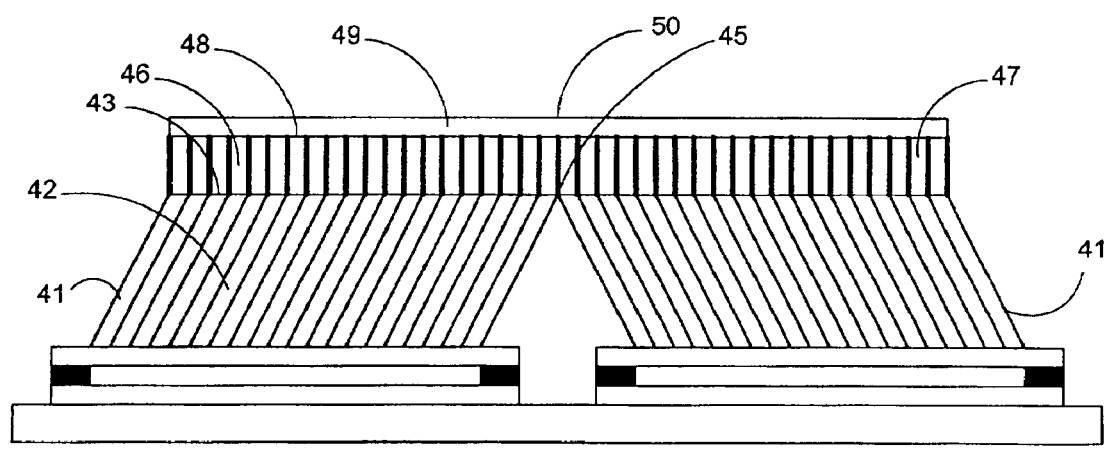
FIG. 21 shows the side view depicted in FIG. 19 with additional fiberoptic plates superimposed on the previous fiberoptic plates, where the fiber axes on the new plates are normal to the plane of the tiles.

In a specific embodiment, shown in FIG. 21, fiberoptic plates 46, 47 in which the fibers are all normal to the light-emissive surface of the tiles are located on surface 43. Light emerging from displacement plates 41, 42, at surface 43 is optically coupled to normal fiberoptic plates 46, 47. A fraction of the light emerging from surface 43 is not accepted into the fibers in the normal plates 46, 47 for transmission to surface 48. This fraction of light can be, for example, 20 to 40%. This unaccepted light may transmit laterally through a number of fibers and emerge at surface 48 at an arbitrary position. This unwanted diffuse light at surface 48 has the undesirable effect of reducing the contrast of the final image. To reduce this effect, the normal plate can be manufactured with extra mural absorber, so as to absorb much, if not all, of the stray light. Advantageously, all of the light which exits surface 48 coming from one or other displacement tiles has a central angle which is normal to its surface. In this way, there is no discontinuity in viewing the image at surface 48. The angular divergence of the light exiting surface 48 can be about ±30°, for a numerical aperture of the fibers of about 0.5. The use of extra mural absorber in the normal plates can therefore produce improved image contrast.

In a specific embodiment of this invention, a diffuser sheet 49 can be optically attached to surface 48. The diffuser sheet can increase the angular divergence of the light exiting surface 50 as compared to the light exiting surface 48. For example, the angular divergence can be increased from ±30° to +60° divergence from the surface 50 shown in FIG. 21. This can permit wide angle viewing of the flat panel display. A typical diffuser sheet which can be used for this purpose is available from Physical Optics Corporation as Light Shaping Diffuser Model No. LSD95x35 PC10-2. A variety of sheets are also known in the art which increase the contrast of the display image. For example, U.S. Pat. No. 5,880,887 describes a lenticular lens sheet which restricts the reflection of outside light and enhances the contrast of the displayed image without substantially reducing the image brightness, and is hereby incorporated by reference.

Figure 22A:
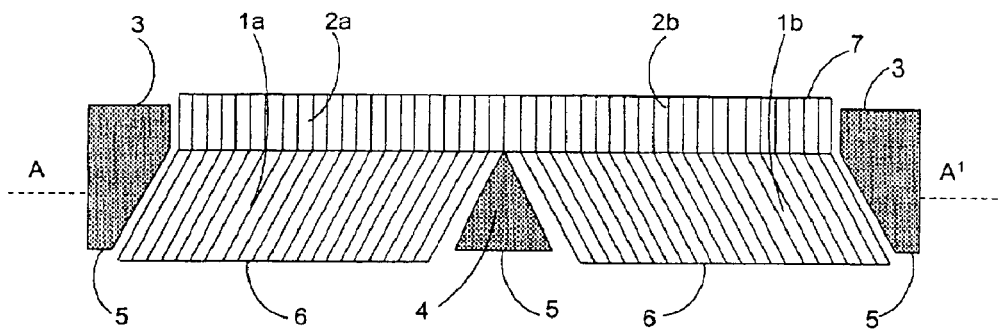
FIG. 22A shows a schematic drawing of a mechanical frame which aligns the fiberoptic plates and provides a strong, self-supporting structure.
Figure 22B:
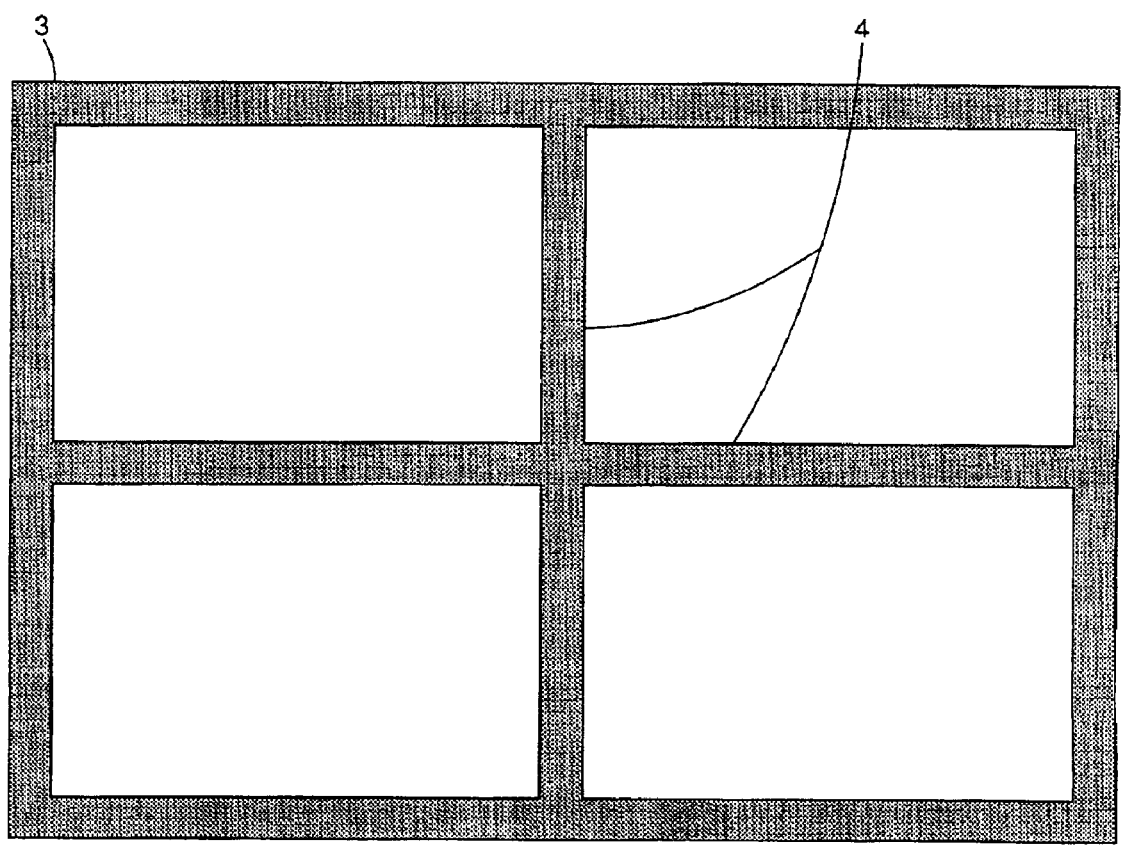
FIG. 22B shows a schematic drawing of a mechanical frame which aligns the fiberoptic plates and provide a strong, self-supporting structure.

FIGS. 22A and 22B are schematic diagrams of a mechanical means by which the fiberoptic plates of FIG. 20 can be physically connected in a self-supporting manner. Displacement plates 1a and 1b can each be optically coupled separately to their respective normal plates 2a and 2b. Alternatively, displacement plates 1a and 1b can each be optically coupled to a single normal plate. A frame 3 can encircle the plates as shown in FIG. 22A, and, in addition, a bridge 4 can be fitted within the frame and fills the space between the plates. FIG. 22B shows a cross-section through A–A' in FIG. 22A. Preferably, bridge 4 is inserted into place in frame 3 such that the fiberoptic plates are constrained from motion in any direction. The surfaces 5, 3 of the frame shown in FIG. 22A are not co-planar with the surfaces 6, 7 of the fiberoptic plates. The frame and bridge can be fabricated from, for example, metal, composite material or other lightweight, high modulus material. Assembly of the system can proceed by inserting the fiberoptic plate combinations within the frame 3 and subsequently impressing the bridge 4 into the frame. Surfaces between frame, plates, and bridge may have pressure-sensitive curing epoxy which provides a rapid cure and a rigid system. These systems, termed fiberoptic systems can be prepared in advance of the application of tiles.

Figure 23:
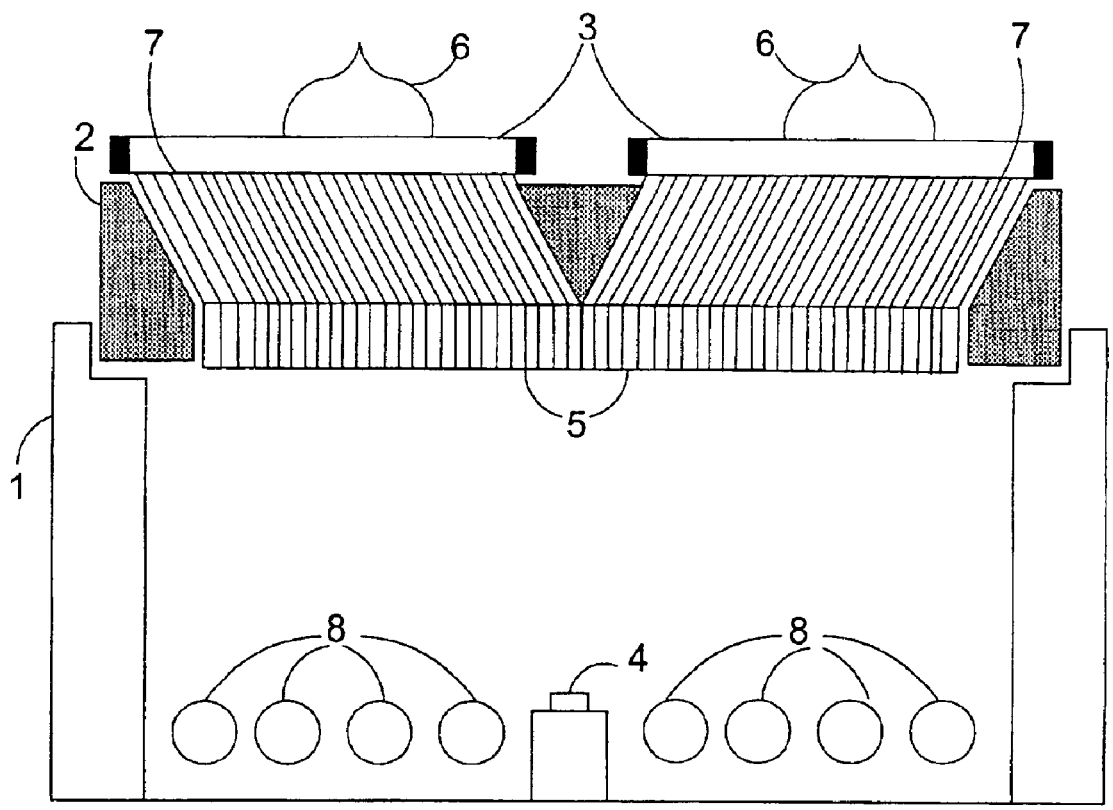
FIG. 23 shows a specific example of equipment which can be employed to apply tiles to the subject fiberoptic plates.

A schematic of a specific embodiment of the tile application process is shown in FIG. 23. The fiberoptic system 2 can be placed on the rectangular frame 1 which fits the shape of system 2. A camera 4 can be located to provide a high-resolution image of the surface 5. Tiles 3 can then be held by manipulators 6. In a specific embodiment, manipulators 6 can be remote control. A visible light cure epoxy, such as OP-30, available from Dymax Co., Torrington, Conn., can be applied to the tile surface 7 before the tile is placed in contact with its fiberoptic module. When all tiles have been impressed on their respective fiberoptic modules, images can be projected from the tiles through the fiberoptics and recorded by the camera 4. The image data file can then be analyzed by a computer to determine the spatial location coordinates in two dimensions and the rotational coordinates of each of the tiles. The computer can then control the manipulators 6 to reposition the tiles both laterally and rotationally to achieve the correct position. An image can be recorded again and analyzed to confirm that the position of the tiles is correct. Final quality control of the system image can be performed using a series of images. Image distortion, color fidelity, blemishes, contrast, dynamic range, brightness, and resolution are parameters which can be measured and characterized. When the system does not meet specifications, it may be due to either one or more of the tiles, or due to the fiberoptic system. In these cases, components can be changed and the process restarted. The tests can thus be repeated until all specifications have been met. At that time, the computer can activate the light sources 8 so as to effect a cure of the epoxy between tiles and fiberoptic systems within seconds. As a result, the entire frame, fiberoptic and multiple tiles becomes a rigid system. The system is removed from the support 1 and may then be used as a large flat panel display.

In a specific embodiment of the subject invention, a clear 0.25 mm diameter polymeric optical fiber can be attached to one corner of each translation fiberoptic plate to permit light from the emissive area of each tile to enter the fiber and be transported to a photo sensor. In this way, the brightness of each tile can be monitored continuously and automatically. Accordingly, when the brightness of one of the tiles strays from that value which provides a good balance compared to the brightness of the other tiles, automatic brightness control can bring them all into brightness conformity.

Figure 24:
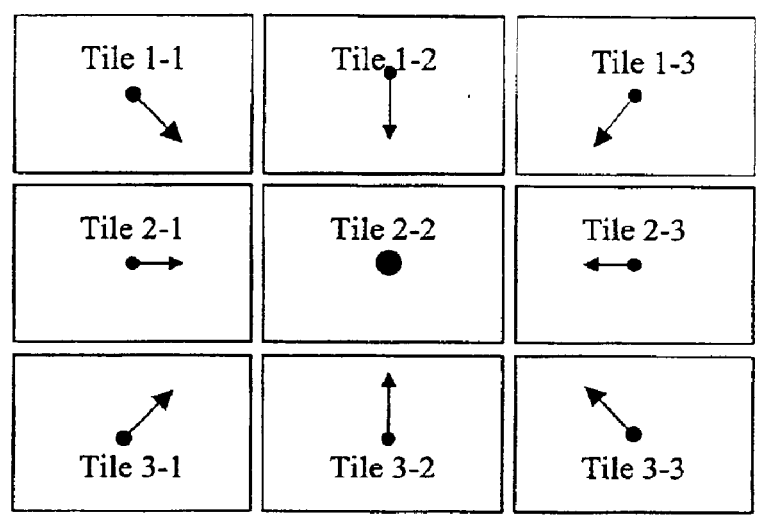
FIG. 24 shows a specific embodiment of a 3×3 array of tiles, with arrows indicating the planar projected directions of the optical fibers comprising the fiberoptic plates which are superimposed on the tiles.
Figure 25A:
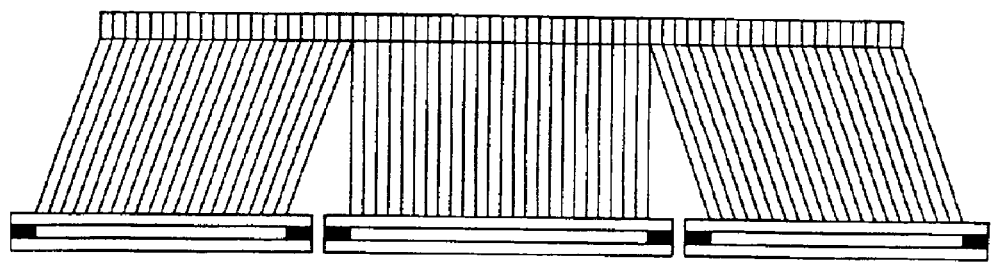
FIG. 25A shows a side cross-sectional view of the tiles in a 3×3 array and associated fiberoptic plates which translate the emissive areas of the tiles into contiguity.
Figure 25B:
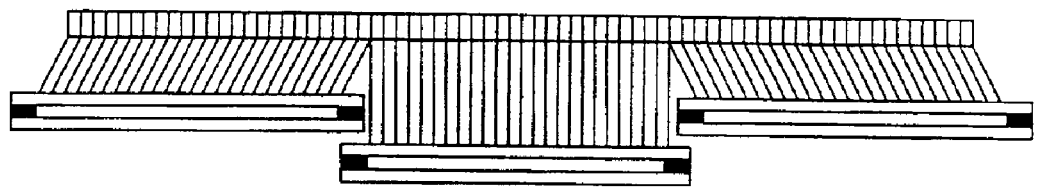
FIG. 25B shows a side cross-sectional view of the tiles in a 3×3 array with a non-planar LCD arrangement.

FIG. 24 illustrates a flat panel display having nine tiles. The planar projected directions of the fibers in each fiberoptic plate is shown by arrows. The arrows are shown longer than they actually are for clarity. FIGS. 25A and 25B show a schematic of a side cross-sectional view of the flat panel display depicted in FIG. 24. The subject invention also relates to arrays of m×N tiles, where m and n are integers.

In general, the orientation structures of the subject fiberoptic plates fall into three classes, as can be seen from FIGS. 20 and 24. An example of the first class, Class I, is tile 2-2 in FIG. 24. The fiberoptic plates of Class I have fibers which are normal to its surface. Tile 1-1 in FIG. 20 is an example of Class II fiberoptic plates in which the fibers have a projected angle relative to each of its edges. For a square tile the projected angle can be 45° relative to each edge. The angles can be appropriately modified for a tile with another aspect ratio. As discussed above, any angle relative to the edge can be used. Tile 2-1 in FIG. 24 illustrates a Class III fiberblock, in which the fibers have a projected angle at 0° relative to one of its edges.

Figures 26A, 26B, 26C:
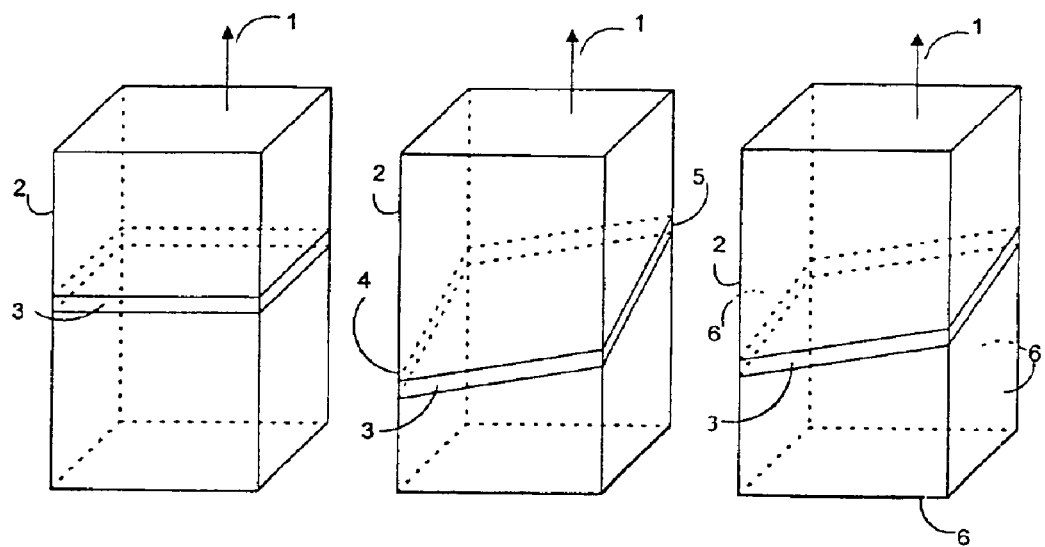
FIGS. 26A, 26B, and 26C each show a massive block having polymeric optical fibers whose axes run parallel to the arrows 1, each having a different cross-sectional slice shown.

These three classes of orientation structures are shown in FIGS. 26A, 26B, and 26C, as cross-sectional cut-outs from a massive block 2 of optical fibers whose axes run parallel to the arrows 1. Such blocks 2 can be used as the raw material for fiberoptic plate manufacture. These blocks can be produced by the methods taught in the subject application or by other methods known in the art. As described in the subject application, the subject method involves the extrusion of a polymeric sheet composed of an array of optical fibers. These sheets can be stacked and fused at high temperature to form a block of optical fibers. Alternatively, the extruded sheet may be coated with adhesive and stacked one on top of the other to form a block of optical fibers.

To produce a Class I, fiberoptic plate 3 a block can be cut in two parallel planes, with normal 1 as illustrated in FIG. 26A. To produce fiberoptic plates 3 of Classes II and III, blocks are cut in two planes as illustrated in FIGS. 26B and 26C, respectively. A normal to these planes in 26B and 26C makes an angle of 10° to 20°, and typically 15° relative to the axes of the fibers, 1. In FIG. 26C, the intersection of the planes with two of the block sides will be a line parallel to the top and bottom faces of the block. The fiberoptic plates can then be machined flat with both faces parallel and optically polished by methods known in the art of handling plastic sheets.

The material in the fiberoptic block 2 in FIG. 26A is used efficiently in producing fiberoptic plates 3. However, the efficiency of using the material to produce fiberoptic plates is less in the case of FIGS. 26B and 26C. In the case of FIG. 26B, a typical diagonal distance from point 4 to point 5 is 38.1 cm, corresponding to fabricating a plate for use with a 15-inch LCD tile. As a result, point 5 is 6.63 cm above point 4. It is possible to calculate the efficiency of utilization of fiberoptic material in block 2 of FIG. 26B as a function of length of the block. The result is given in Table 3.

TABLE 3

Efficiency of Plate Production Versus Block Length

| Length of Block (cm) | Efficiency of Use of Block in Production of Plate (%) | Number of Produced Plates (26 mm thick) |
|---|---|---|
| 25 | 73 | 9 |
| 50 | 87 | 18 |
| 100 | 94 | 37 |

For high frequency, low-cost manufacturing it is desirable to use fiberoptic block lengths of at least 50 cm. When 50 cm long blocks are used in FIGS. 25A, 25B, and 25C, satisfactory efficiencies in excess of 90% can be achieved.

It is important to note that the outer faces, 6, of the fiberoptic blocks 1 illustrated in FIGS. 26A, 26B, and 26C can be made smooth to approximately 25 microns, for example by using the manufacturing process described in the subject invention. Furthermore, the process of cutting the fiberoptic plates 3 from the blocks 1 involves angels typically less than or the order of 20° relative to these faces 6. It has been found that all cut edges can be maintained straight to 25 microns without splintering of individual microfibers from the block 2.

In order to keep the angles of the fibers relative to normal in the 10–20° range, the displacement plates shown in FIGS. 24 and 25A for the 3×3 tile array need to be about twice as thick as the displacement plates shown in FIGS. 20 and 21 for the 2×2 tile array. The reason for this increased thickness for the 3×3 array is the fact that the eight peripheral tiles must have their images translated twice as much as in a 2×2 array. In a specific embodiment, for the given angle of 15° for the axes of the optical fibers relative to the normal to the tile surface, the displacement plate thickness is increased from 26 mm to 52 mm. This thickness doubles the weight of the fiberoptic systems which in some circumstances may be disadvantageous.

The doubled weight of the fiberoptic system described above can be largely eliminated by not insisting that the LCD panels lie in a plane. FIG. 25B is a schematic of a specific embodiment of this invention, showing a fiberoptic system for a 3×3 tiled array in which the weight per unit area has been increased by only a few percent above that of a 2×2 array. The thickness of the eight peripheral fiberoptic displacement plates is maintained at 26 mm with a 15° displacement angle. The length of the central fiberoptic plate is made long enough, say 36 mm, to not physically interfere with the other LCD panels. This represents a negligible (4%) increase in weight per unit area of display compared to a 2×2 tiled array. An added feature of this embodiment is that no significant additional mechanical or optical complexity is accrued beyond that of a 2×2 tiled array.

The display image brightness of the central area will be higher than in the peripheral area due to the straight path of the fiberoptics. The central LCD panel may be reduced in brightness relative to the peripheral LCD panels to compensate for its more efficient fiberoptic system.

Figure 27A:
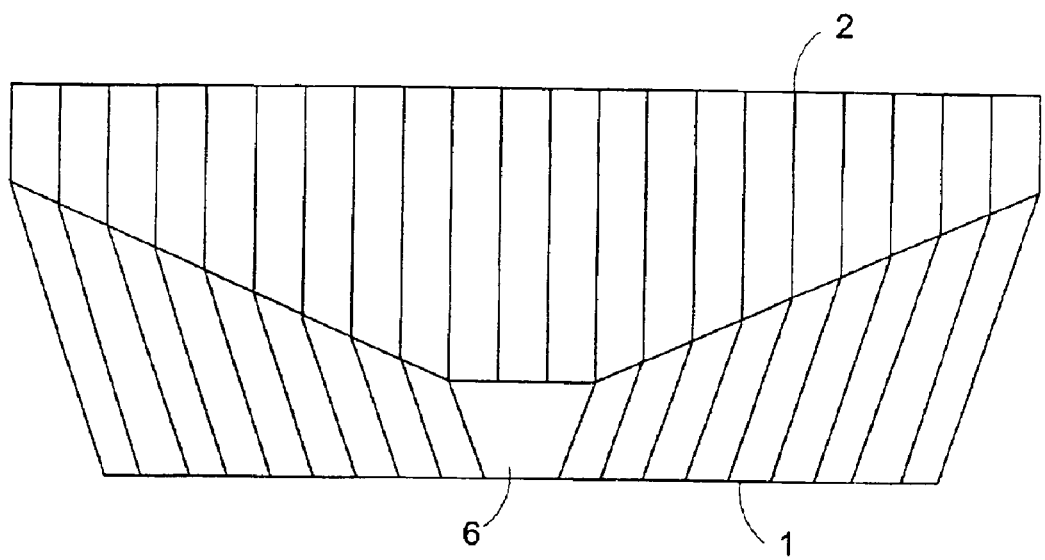
FIGS. 27A, 27B, and 27C each show a side cross-sectional view of a specific embodiment of a fiberoptic image expander plate.
Figure 27B:
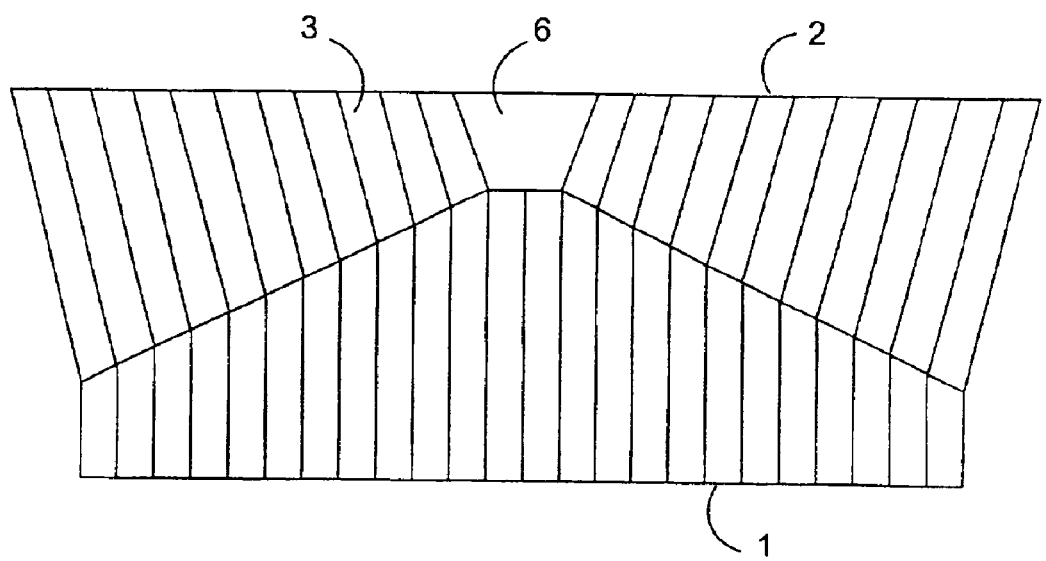
Figure 27C:
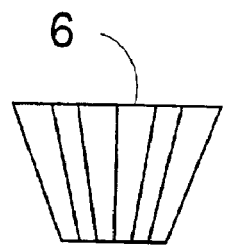
Figure 27D:
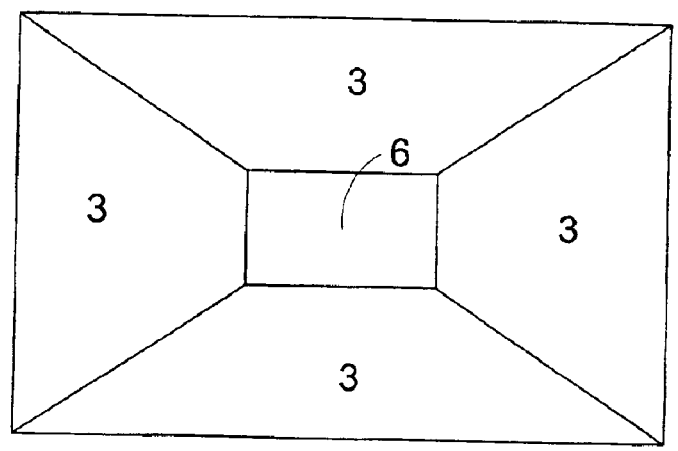
FIG. 27D shows a plan view of the fiberoptic image expander shown in FIG. 27B.

In another embodiment of this invention, it is possible to fabricate a special fiberoptic plate for the central tile of a 3×3 tile array which permits use of a standard thickness fiberoptic plate system. Schematic of examples of such special fiberoptic plates are shown in FIGS. 27A, 27B, 27C, and 27D. The first two FIGS. 27A and 27B illustrate two options for fiberoptic structures which operate as image expanders from surface 1 to surface 2. A conceptually related expander fiberoptic plate is described in U.S. Pat. No. 4,139,261, which is hereby incorporated by reference. Due to the very small angle tapered sections of fiberoptic material disclosed in U.S. Pat. No. 4,139,261, it was found to be very difficult, if not impossible, to manufacture such sections without severe splitting of the material. The designs shown in FIGS. 27A–27D overcome that problem. FIG. 27C shows the fiberoptic taper insert 6 which can fit into the major components depicted in FIGS. 27A and 27B. An advantage of the version shown in FIG. 27B is that the fiberoptic taper 6 can be inserted into the system after the plates 3 have been added. FIG. 27D shows a plan view of the plate depicted in FIG. 27B. In this case, components 3 are made into four parts as indicated in FIG. 27D. All corners and edges of the six components of the expander plate can be designed such that they can easily be manufactured without fiber splinter. The five large components can all be cut and polished using a numerical controlled milling machine. The component 6 is a fiberoptic taper and can be manufactured by methods well known in the art. Due to the high precision and reproducibility of the computer-controller manufacturing of the components, they fit together well and can be glued together with UV cure epoxy at the optical interfaces.

Figure 28:
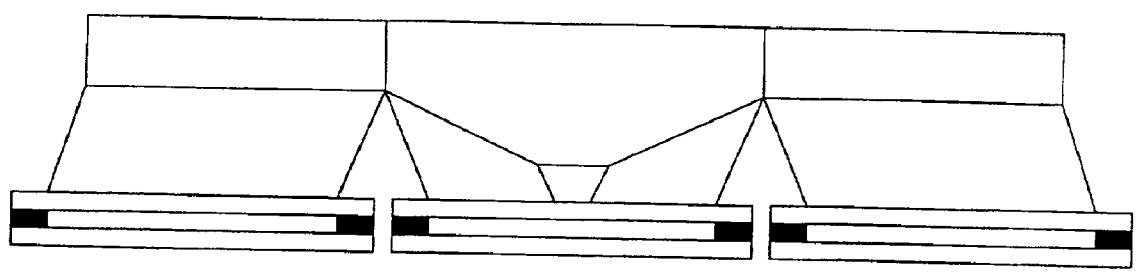
FIG. 28 shows a side cross-sectional view of a 3×3 array of tiles in which an image expander plate is used with respect to the central tile.

It may be noted that the above fiberoptic expander plate produces a larger display area than the original emissive surface area of the LCD panel. As a result, the number of emitted photons per unit area from the display surface is reduced by about 6% in the case under discussion. Thus, in a 3×3 tiled array, the central area of the array will be darker by a few percent than the surrounding area. It may be desirable to increase the brightness of the central LCD panel to compensate for this effect. This may be achieved manually, or by the automatic brightness control discussed earlier. Alternatively, the other sections of the 3×3 tiled array may also be replaced by expander type sections. When this type of fiberoptic expander plate is used for the central tile in a 3×3 tile array, a thin and light fiberoptic system can be achieved. A cross-section of such a system is depicted in FIG. 28. This type of fiberoptic image expander plate could also be used to attach to every LCD tile and used with other tiling arrays. Due to the additional machining and gluing costs for an expander as compared to displacement plates, it may be optimal to use the expander plate only where it is required. For example, in a specific embodiment of a 4×4 filed array, the central four tiles may be fitted with expander plates, and the surrounding twelve tiles can have the standard displacement plates described earlier.

In another embodiment of this invention, it is possible to provide viewing of high resolution, three-dimensional images on the large flat panel display. U.S. Pat. No. 6,040, 807 describes a 3-D display which may be viewed without the use of special glasses. U.S. Pat. No. 6,040,807 and other patents cited therein describe a variety of methods of permitting the viewing of 3-D images both with and without special glasses, and are hereby incorporated by reference. All of these methods require that the display provide at least one high resolution image (say 1024×768) for each eye separately. Existing large flat panel displays do not provide the extremely high resolution, 2048×1536, necessary to implement 3-D viewing capability. In a specific embodiment of this invention described above, a 3×3 array of 17" XGA LCD tiles provides a pixel resolution of 3072×2304. This resolution is adequate to implement the above and other patented methods of producing high resolution 3-D images.

It is a further object of this invention to describe a different method of using the fiberoptic system described above. Instead of light traversing the fiberoptic system from the plurality of tiles to form a large display, it is possible to use the system for light traversing the system in the opposite direction. In this case, a large light-emitting surface has its light go through the fiberoptic system and emit from a plurality of small surface areas. A typical application of this method of operation is in the form of a large area imaging x-ray detector. Specifically, if a screen which emits light when exposed to a spatially varying x-ray flux is optically coupled to the large area of the fiberoptic system, segments of the resulting visual image can be produced at the plurality of small areas at the exit of the system. Two-dimensional visual photon detectors, such as charge-coupled devices (CCDs) or amorphous silicon detectors may be optically coupled to these small area exits of the fiberoptic system. Since there is inevitably a non-sensitive area at the periphery of these light detectors, the fiberoptic system can permit the imaging of very large area x-ray fluxes with existing small area visual detectors.

Following are examples which illustrate procedures for practicing the invention. These examples should not be construed as limiting.

EXAMPLE 1

Production of Massive Fiber Optic Plate with Fibers Parallel to the Normal to the Plate Surface Polystyrene containing 3% by weight of diphenyl sulphide was selected as the core material. Polymethylmethacrylate with 3% by weight of Tributyl phosphate was selected as the cladding material. Polymethylmethacrylate containing 5% by weight of carbon black in the form of particles whose average size was less than 0.2 microns was selected as the sea material.

The above materials were extruded through a die similar to that shown in FIG. 6, having an exit slit 50 cm wide. The fiber center-to-center spacing in the drawn sheet was 25 $\mu$m and the die was designed to produce four rows of fibers with a final sheet thickness of about 100 $\mu$m. The structure of the core holes in the die was an oval with major and minor axes of 200 $\mu$m and 27 $\mu$m respectively. The total fiber array was 4×20,000 and a schematic of a short section of this type of ribbon is shown in FIG. 7C. The temperature of the die was 210° C. and the head pressures of the extruders were 3010 psi, 3550 psi, and 3475 psi for the core, cladding, and sea polymers, respectively.

Figure 13:
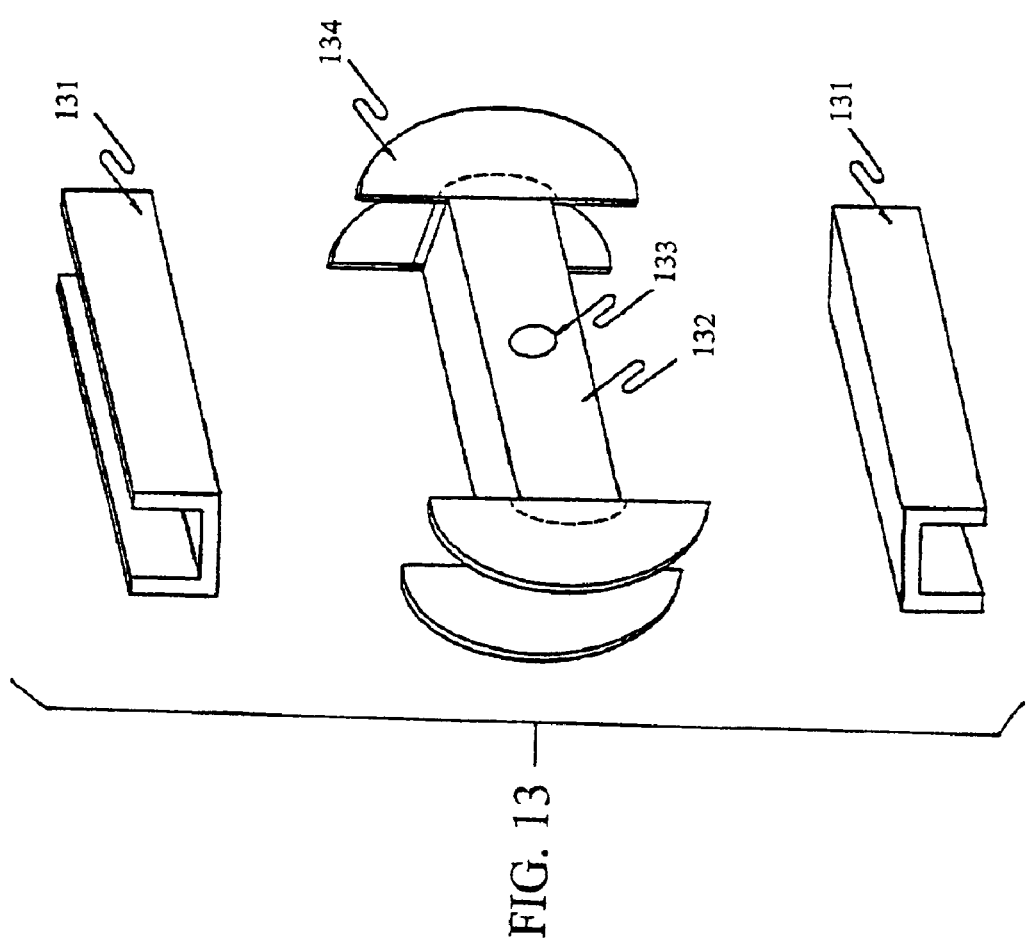
FIG. 13 shows a schematic diagram of a specific embodiment of a rotating spool which is formed from two back-to-back fixtures.

The 100 $\mu$m thick sheet was cut at each side of the extrudate to produce a final sheet width of 46.0 cm. This sheet was wound onto a 46.05 cm wide and 150 cm long fixture as shown in FIGS. 12 and 13. Winding continued for 3450 complete revolutions of the fixture to produce a total layup thickness in excess of 34.5 cm. At that point winding was stopped and two TEFLON-coated 0.5" thick stainless steel plates were mounted onto the two top long sides of the fixtures on the winding system. The plates were able to exert a controlled and fixed pressure of 5 lb/square inch on the plastic sheet layup. The plastic sheets were cut through at each end of the two fixtures and the fixtures were removed from the winding system. The fixtures were transported to and inserted into vacuum ovens. The temperature cycle used was 12 hours at 65° C. followed by five hours at 150° C. The heating was turned off and the fixtures were allowed to return to room temperature and brought up to room pressure. The fixtures were removed from the vacuum ovens and were dismantled to allow access to the fused boule whose dimensions were 150 cm×46.05 cm×34.5 cm. The boule was cut into plates, each of whose size was 2.2 cm thick and 46.05×34.5 cm² area Each plate was given a final surface treatment with a high-speed rotating diamond tool to produce a 2.00 cm thick plate which had polished faces on each of the 46.05×34.5 cm² faces.

Optical transmission through a 2.0 cm thick plate T($\lambda$) for light at angles within the fiber numerical aperture acceptance can be written as:

$$T(\lambda) = \frac{\text{Area of Cores}}{\text{Total Area}} \times T_c(\lambda)$$

where $T_c(\lambda)$ is the transmittance through a single fiber. The shape of the cores was between round and a square and about 19 $\mu$m diameter. The cladding thickness was about 2.0 $\mu$m and the rest of the area was taken up with sea material. The ratio of Area of Cores to Total Area was estimated from measuring and averaging a number of fibers to be 0.50±.02. T($\lambda$) was measured to be constant at 0.44±.02 for 1 in the range 450–650 $\mu$m. This implied that the transmission, $T_c(\lambda)$, through an individual 2 cm long fiber is 0.88. After allowing for Fresnel reflection at the surfaces, this transmission is very satisfactory.

Image transmission studies were conducted. Distortion of the image was measured to be less than 0.2 mm over the entire imaging area of 46.05×34.5 cm². Furthermore, the image was of uniform brightness (to ±5% averaged over a 1 cm² area) up to a distance of 0.03 mm (or approximately one fiber distance) from the physical edges of the plate. Within that single fiber distance, the brightness fell to typically half the overall brightness of the image.

EXAMPLE 2

Continuous, High-Speed Production of Massive Fiberoptic Plate Using Adhesive Between Sheets Sheet was produced using the materials given in Example 1. The fiber center-to-center spacing in the drawn sheet was 100 microns and there were four rows of fibers with a final sheet thickness of about 400 microns. The width of the cut sheet was 46.0 cm as in Example 1. Sheet was produced at the rate of 20 meters per minute.

The winding fixture shown schematically in FIGS. 12 and 13 was four meters in length. Winding of the sheet was begun. When the first layer of sheet on one side of the fixture was laid, a spray of adhesive was made to cover the surface of the sheet. As the fixture rotated, a second sheet layer was laid on top of the adhesive. As the second sheet came into contact with the adhesive, a roller pressed the second sheet into intimate contact with the adhesive and, thereby, the first sheet. The adhesive used was DARC CURER® manufactured by Dymax, Torrington, Conn. Immediately after the sheets were pressed into close contact, curing began and was complete within a few seconds.

The steps of laying a sheet into place in the fixture, spraying with adhesive, overlaying another sheet, rolling the sheet with a pressure roller, and curing the adhesive is performed in a continuous fashion as the sheet is extruded and wound on the fixture. Winding was ceased after 862 revolutions to produce a lay-up thickness of 34.5 cm. The 4 m long boule was cut in 1m long sections with transverse dimensions of 46.05 cm×34.5 cm. The individual sections of boule were removed from the fixture and cut and polished as desired.

The optical properties of the boule material were measured to be similar to those in Example 1.

The production method used in this example is a continuous process and therefore very time-efficient.

EXAMPLE 3

Production of Massive Fiber Optic Plate with Fibers Parallel to the Plate Surface It is desired to produce a plate 114 cm×85 cm×8.5 cm thick with fibers beginning and ending on the sides whose areas are 114×8.5 cm².

Core material was chosen to be polystyrene. The cladding material was polymethylmethacrylate with 3% by weight of methyl perfluorooctanate. In this case, sea material was not employed. A 120 cm wide die similar to that shown in FIG. 2 was used with four rows of core holes, each hole having dimensions 32 μm×300 μm.

Extrusion was carried out as in Example 1 and the extruded sheet was cut to produce a final width of 113.9 cm and the fiber cores were approximately circular and about 30 μm diameter and had axis-to-axis distance of 34 μm. The fiber array in the final sheet was 4×33,500.

The 136 μm thick sheet was wound on to a pair of 114 cm wide rotating fixtures, the length of which were 175 cm as shown schematically in FIGS. 12 and 13. A total of 625 layers of sheet were stacked before stopping the rotation. As in Example 1, the layup was compressed, cut, and fused in a vacuum oven with the same temperature cycle.

A boule was removed from the fixture and had dimensions 114 cm×8.5 cm×175 cm. The boule was rough cut at each end and in the middle to produce two boules, each 114 cm×8.5 cm×85.3 cm. The 85.3 cm dimension is precision cut and diamond tooled to give an optical finish and final length of 85.0 cm. The fiber ends are on the polished surfaces of area given by 8.5 cm×114 cm².

The optical transmission ($T(\lambda)$) was measured as in Example 1 and found to be 0.31 to 0.41 over the wavelength range 450 mm to 650 nm respectively. Distortion of the image was measured to be less than 0.6 mm over the entire imaging area of 8.5 cm×114 cm. The image was measured to have uniform brightness (to ±5% averaged over a 1 cm² area) up to a distance of 0.035 mm from the physical edge of the plate in a manner analogous to Example 1.

EXAMPLE 4

This example describes the fabrication of a 34" diagonal display composed of an array of four 17" diagonal AMLCD tiles. A massive block of fiberoptic material with transverse dimensions 10.2" by 13.6" was manufactured according to the method described in the subject application. The fiber core diameters are 0.003 inches and the fiber pitch is 0.0034 inches. The full 34" diagonal display has an array of 8,000 by 6,000 fibers. Thus, the resolution of the display is determined by the AMLCD tiles rather than the fiberoptic structures. The chosen fiberoptic manufacturing method included an opaque sea polymer surrounding each fiber. The sea polymer was polymethylmethacrylate containing 5% by weight of carbon black composed of <1 micron-sized particles. A 13-inch-wide die was used to produce a drawn down sheet with 10.2" width. Sheets were stacked using adhesive to produce a solid fused boule with dimensions 10.2"×13.6"×36". Four 1.04" thick sections of fiberoptic plate were cut at an angle of 15° as in FIG. 26B and machined and polished to have a 17.0" diagonal distance. An additional four 0.50" thick sections were cut as in FIG. 26A and machined and polished.

Displacement and normal plates were mated using ultraviolet-activated adhesive. FIGS. 22, 23, and 24 illustrate the method by which the large flat panel display is manufactured from the optical and mechanical point of view.

The drive electronics for the four AMLCD tiles is designed to display one quarter of the total image on each tile. The desired brightness of the full display was acceptable after an adjustment to the brightness of each tile. A diffuser film manufactured by Physical Optics Corporation Model No. LSD95x35 PC10-2 was glued to the full display area of the fiberoptic structure. This diffuser provides an acceptable viewing angle of ±60' in the horizontal and ±30° in the vertical plane.

The final flat panel display provided a bright, full-color, seamless display with high contrast over the entire image area.

EXAMPLE 5

This example describes the fabrication of a 51" diagonal display composed of an array of nine 17" diagonal AMLCD tiles. A massive block of fiberoptic material identical to that described in Example 4 was fabricated. The tile layout is shown in FIG. 28. The fiberoptic plates required for the corner tiles are identical to those described in Example 4. The other peripheral fiberoptic plates were cut from the massive block of fiberoptic material as illustrated in FIG. 26C. The result is that the planar projection of the fiber axes is parallel to one or the other of the sides of the tiles. Finally, the middle tile is made as shown in FIGS. 27A, 27B, 27C, and 27D from the massive block of fiberoptic material. The design of the taper element in FIG. 27C is such that the length of the taper is made long enough, 3.0 mm, to ensure that the adjacent edges of the four plates 3 can be cut and polished without fraying fibers. Similarly, the width of the taper is made wide enough, ≧3.0 mm, to ensure that the adjacent edges of the four plates 3 can be cut and polished without fraying fibers.

An additional nine 0.50" thick plates were cut as in FIG. 26A and machined and polished. These plates were used as normal plates whose fiber axes were normal to the plane containing the tile emissive surfaces.

Displacement and normal plates were mated as in Example 4. The integrated mechanical structure of the fiberoptic system containing the nine independent systems was fabricated as described in Example 4 and the text. A diffuser film is used as in Example 4.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method of producing an m×N sheet of optical fibers, comprising:

co-extruding a core material and a cladding material through a co-extrusion on die, wherein an m×N array of optical fibers is extruded each having a portion of the extruded core material surrounded by a portion of the cladding material, and wherein m<<N;

merging adjacent optical fibers together after the m×N array of optical fibers exit the co-extrusion die to form an m×N sheet of optical fibers; and cooling the m×N sheet of optical fibers so as to solidify the m×N sheet of optical fibers.

2. The method according to claim 1, wherein cooling the m×N sheet of optical fibers comprises taking up the m×N sheet of optical fibers on a cooling wheel after merging adjacent optical fibers together.

3. The method according to claim 1 further comprising:
drawing down the m×N sheet of optical fibers before cooling the m×N sheet of optical fiber.

4. The method according to claim 3, wherein drawing down the m×N sheet comprises rotating the cooling wheel at a rate which causes the m×N sheet of optical fibers to be taken up by the cooling wheel faster than the rate of extrusion from the co-extrusion die such that the m×N sheet is drawn down.

5. The method according to claim 4, wherein the m×N sheet of optical fibers is taken up at least ten times faster than the rate of extrusion from the co-extrusion die.

6. The method according to claim 4, wherein the m×N sheet of optical fibers is taken up at least about 1.5 to about 30 times faster than the rate of extrusion from the co-extrusion die.

7. The method according to claim 4, wherein the m×N sheet of optical fibs is taken up at least 1.5 times faster than the rate of extrusion from the co-extrusion die.

8. The method according to claim 4, wherein the m×N sheet of optical fibers is taken up at least 2 times faster than the rate of extrusion from the co-extrusion die.

9. The method according to claim 4, wherein the m×N sheet of optical fibers is taken up 1.5 to 30 times faster than the rate of extrusion from the co-extrusion die.

10. The method according to claim 3, wherein after drawing down the m×N sheet of optical fibers, the m×N sheet of optical fibers has a desired cross-sectional shape.

11. The method according to claim 3, wherein after drawing down the m×N sheet of optical fibers, the optical fibers have a desired index of refraction profile.

12. The method according to claim 1, further comprising:
co-extruding a sea material through the co-extrusion die, wherein m×N array of optical fibers is extruded each having the portion of the extruded core surrounded by the portion of the cladding material, further surrounded by a portion of the sea material, wherein the sea material is strongly light absorbing.

13. The method according to claim 12, wherein the sea material is positioned between adjacent optical fibers in a first direction and not between adjacent optical fibers in a second direction.

14. The method according to claim 1, further comprising:
extruding a sea material through the co-extrusion die, wherein the m×N array of optical fibers is extruded each having the portion of the extruded core surrounded by the portion of the cladding material further having a portion of the sea material on at least a portion of an outer boundary of the cladding material such that after mewing adjacent optical fibers together to form an m×N sheet of optical fibers the sea material is on at least one surface of the m×N sheet.

15. The method according to claim 1, wherein $1 \leq m \leq 4$.

16. The method according to claim 1, when $N \geq 100$.

17. The method according to claim 1, wherein the optical fibers have diameters in the range of about 2 microns to about 2,000 microns.

18. The method according to claim 1, wherein the core material comprises one or more materials selected from the group consisting of polystyrene, polymethyl methacrylate, polybenzyl methacrylate, polycarbonate, copolymers thereof, and other compounds copolymerizable therewith.

19. The method according to claim 1, wherein the cladding material comprises one or more materials selected from the group consisting of: polyethyl methacrylate, poly-2, 2, 2-trifluoromethyl methacrylate, polyvinyl acetate, copolymers thereof and other compounds copolymerizable therewith.

20. The method according to claim 1, wherein the optical fibers' refractive indices change discontinuously at the core-cladding boundary.

21. The method according to claim 1, wherein the optical fibers' refractive indices change over a finite distance near the core-cladding boundary thereby varying in a continuous manner at the core-cladding boundary.

22. The method according to claim 1, wherein at least one of the cladding material and the core material comprises one or more diffusible additives, wherein the one or more diffusible additives modify the refractive index of the at least one of the cladding material and the core material.

23. The method according to claim 22, wherein at least one of the one or more diffusible additives increases the refractive index of the at least one of the cladding material and the core material.

24. The method according to claim 23 wherein the at least one of the one or more diffusible additives is selected from the group consisting of benzophenome, biphenyl, 3-phenyltoluene, diphenyl sulphide and 1,2,4,5-tetrabromobenzene.

25. The method according to claim 22, wherein at least one of the one or more diffusible additives decreases the refractive index of the at least one of the cladding material and the core material.

26. The method according to claim 25, wherein at least one of the one or more diffusible additives is selected from the group consisting of: tributylphosphate, triethylphosphate, glycerol triacetate, methylperfluorooctanate and perfluoro2,5,8-trimethyl-3,6,9-trioxadodecanoic acid methyl ester.

27. The method according to claim 1, wherein at least one of the optical fibers is a graded-index optical fiber.

28. The method according to claim 1, wherein the optical fibers are graded-index optical fibers.

29. An m×N sheet of optical fibers produced in accordance with the method of claim 1.

30. An m×N sheet of optical fibers produced in accordance with the method of claim 6.

* * * * *